US009176290B2

(12) United States Patent
Benton et al.

(10) Patent No.: US 9,176,290 B2
(45) Date of Patent: Nov. 3, 2015

(54) MINIATURE PLUGGABLE VIDEO MODULE

(71) Applicant: Advanced Fiber Products, LLC, Des Plaines, IL (US)

(72) Inventors: Mark C. Benton, Itasca, IL (US); Richard C. E. Durrant, Crystal Lake, IL (US); Markus H. Wahl, Berlin (DE)

(73) Assignee: Advanced Fiber Products, LLC, Des Plaines, IL (US)

( * ) Notice: Subject to any disclaimer, the term of this patent is extended or adjusted under 35 U.S.C. 154(b) by 0 days.

(21) Appl. No.: 14/274,755

(22) Filed: May 11, 2014

(65) Prior Publication Data
US 2014/0334827 A1 Nov. 13, 2014

Related U.S. Application Data

(63) Continuation-in-part of application No. 13/343,557, filed on Jan. 4, 2012, now abandoned.

(60) Provisional application No. 61/429,675, filed on Jan. 4, 2011.

(51) Int. Cl.
*G02B 6/36* (2006.01)
*G02B 6/42* (2006.01)

(52) U.S. Cl.
CPC ............ *G02B 6/4284* (2013.01); *G02B 6/4261* (2013.01); *G02B 6/4274* (2013.01); *G02B 6/4292* (2013.01); *G02B 6/4246* (2013.01)

(58) Field of Classification Search
CPC .. G02B 6/4284; G02B 6/4274; G02B 6/4261; G02B 6/4292; G02B 6/4246
USPC .......................................... 385/88, 89, 92, 94
See application file for complete search history.

(56) References Cited

U.S. PATENT DOCUMENTS

| 6,350,063 | B1 | 2/2002 | Gilliland |
| 7,083,336 | B2 | 8/2006 | Kim |
| 7,307,847 | B2 | 12/2007 | Torres |
| 7,332,234 | B2 * | 2/2008 | Levinson et al. ............. 398/135 |
| 7,941,053 | B2 | 5/2011 | Dallesasse |
| 8,052,335 | B2 | 11/2011 | Kasbeer-Betty |
| 2008/0044141 | A1 | 2/2008 | Willis |

OTHER PUBLICATIONS

Lattice Semiconductor Corporation ("SMPTE SDI Demo User's Guide", Jul. 2008).*
Transimpedance Amplifier Solutions, Gennum Corporation, website attached (date published unknown).
Embrionix Coaxial Transceiver, website attached (date published unknown).
Embrionix Coaxial Dual Receiver, website attached (date published unknown).
Lattice Semiconductor Corporation, "SMPTE SDI Demo User's Guide," Jul. 2008.

* cited by examiner

*Primary Examiner* — Ryan Lepisto
(74) *Attorney, Agent, or Firm* — Chicago IP Law; Steven M. Evans

(57) ABSTRACT

A miniature pluggable video module having a length less than one inch, and a width less than three quarters of an inch, and a plurality of pin connectors attached to the back of the housing. The pluggable video module can be mounted horizontally or vertically. Inputs and outputs of the module can be adapted to include various types of optical or electrical connectors. The inputs and outputs of the module can be modified into various combinations of optical or electrical configurations, and the combinations of inputs and outputs also can be modified.

20 Claims, 22 Drawing Sheets

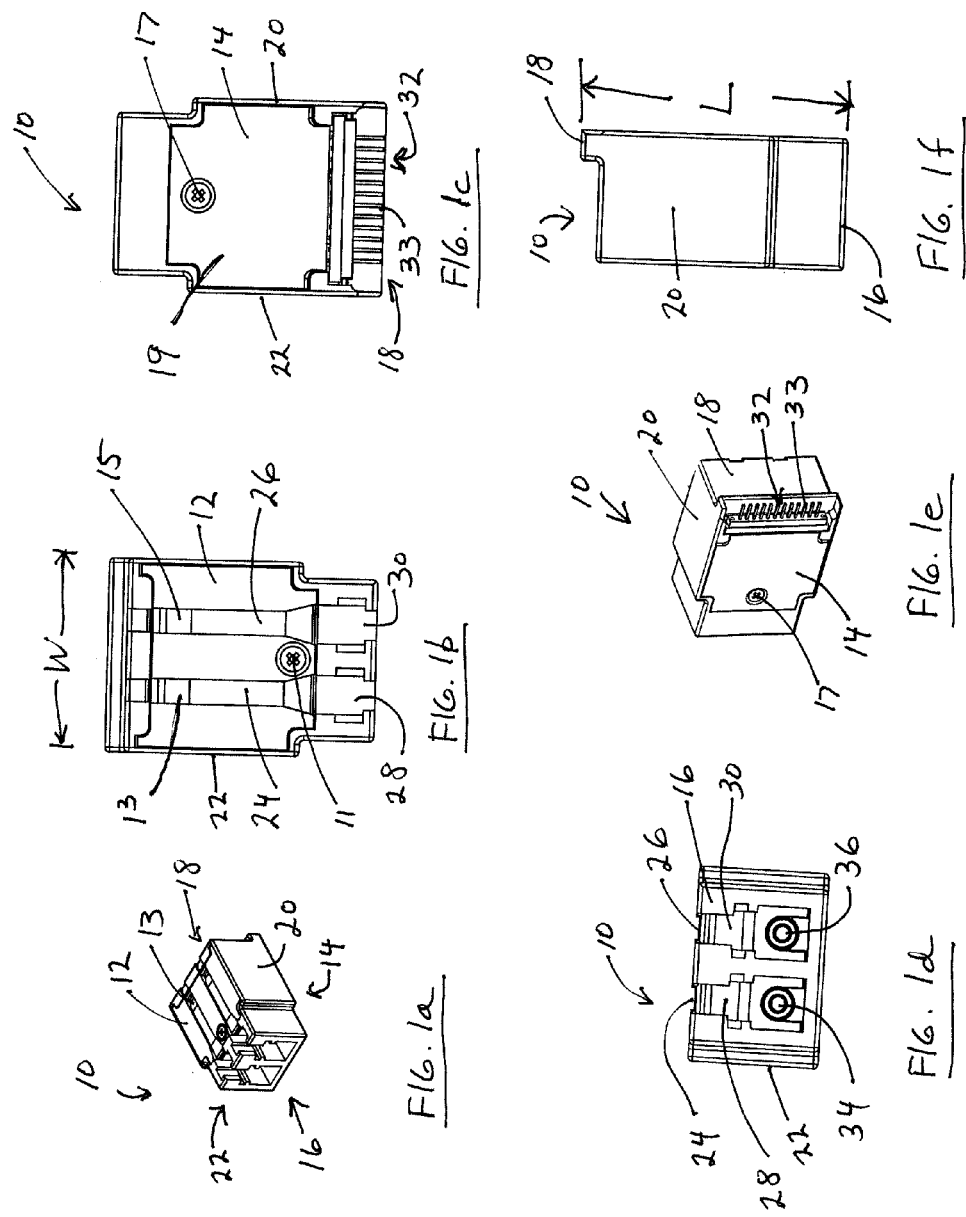

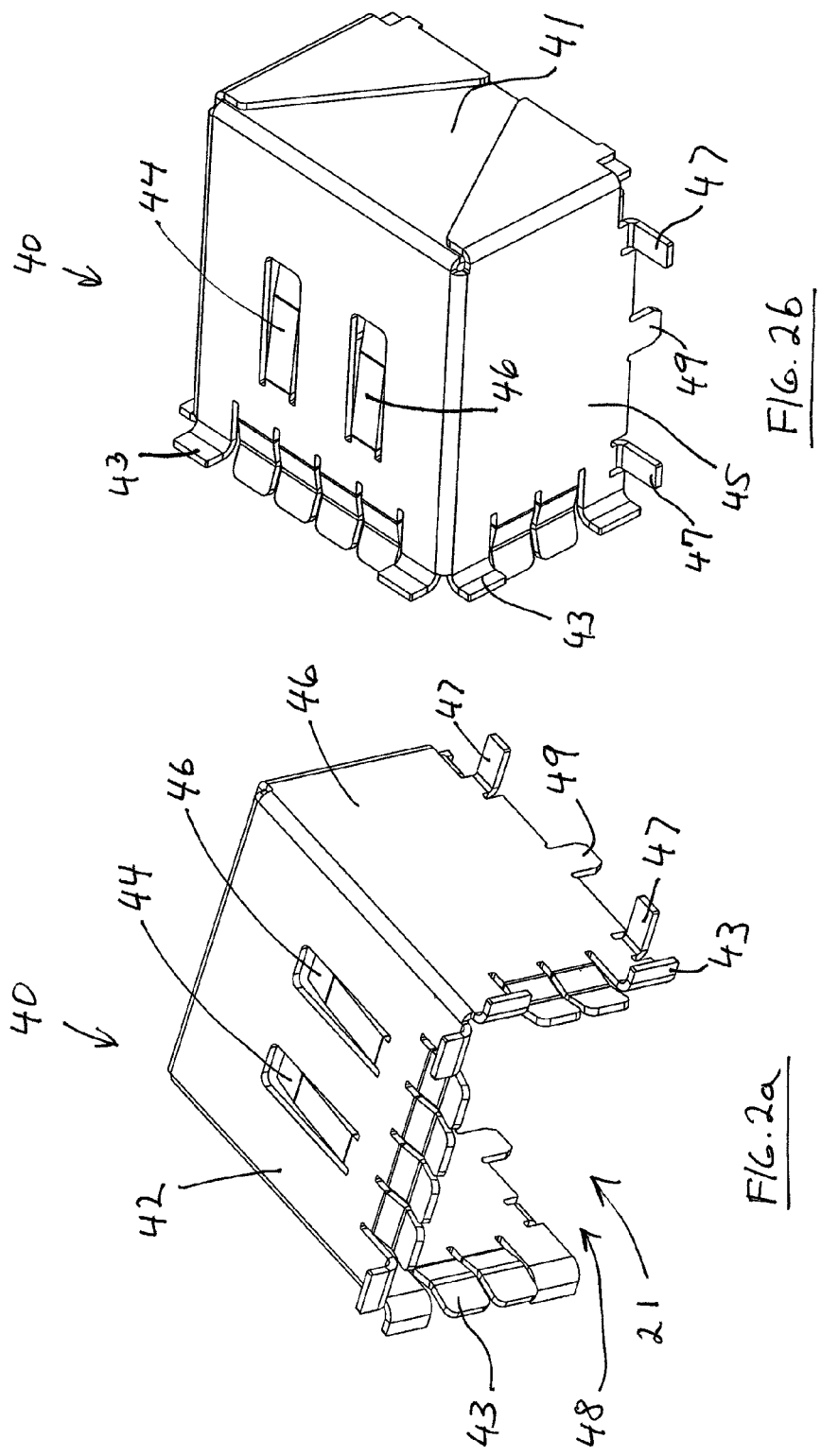

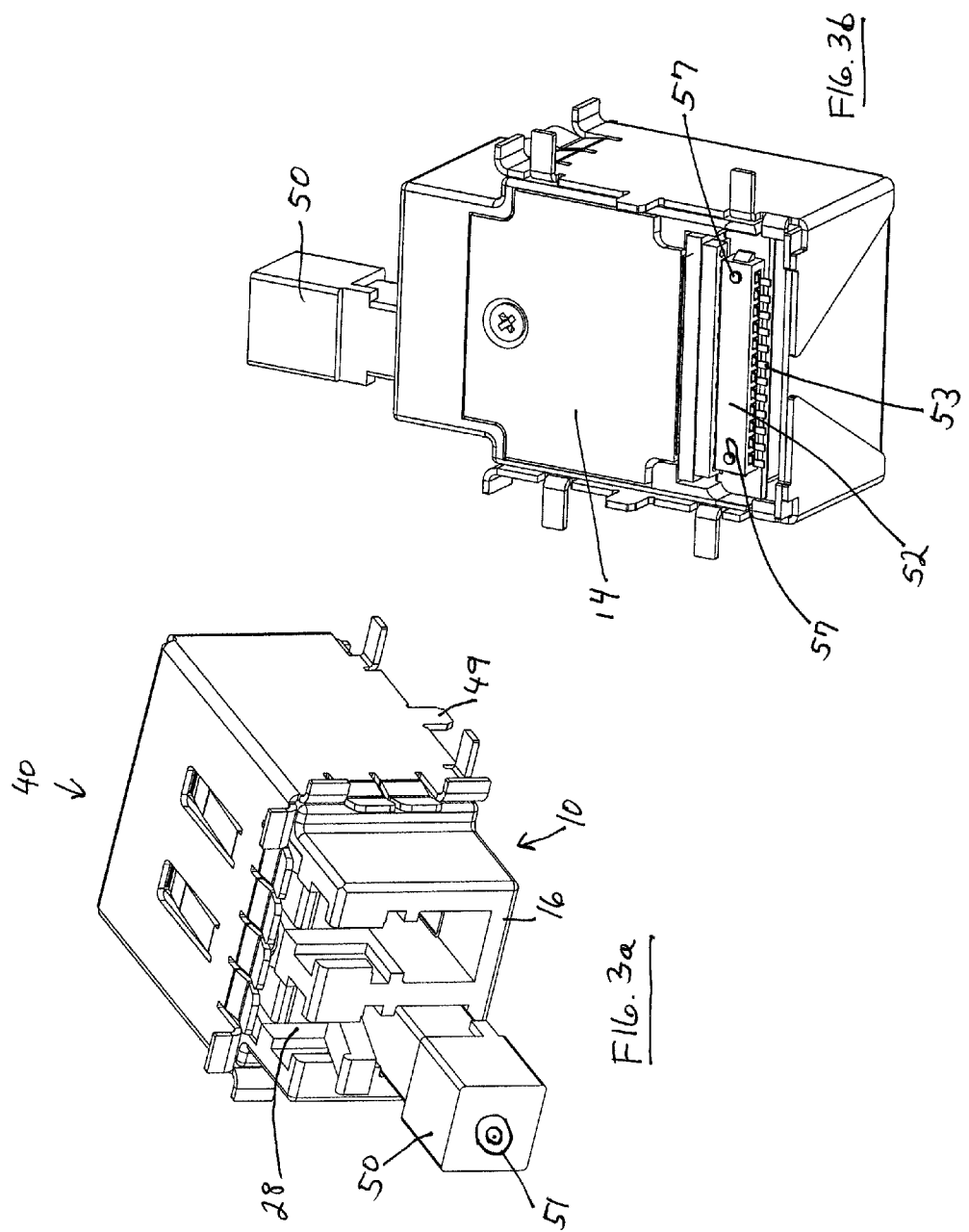

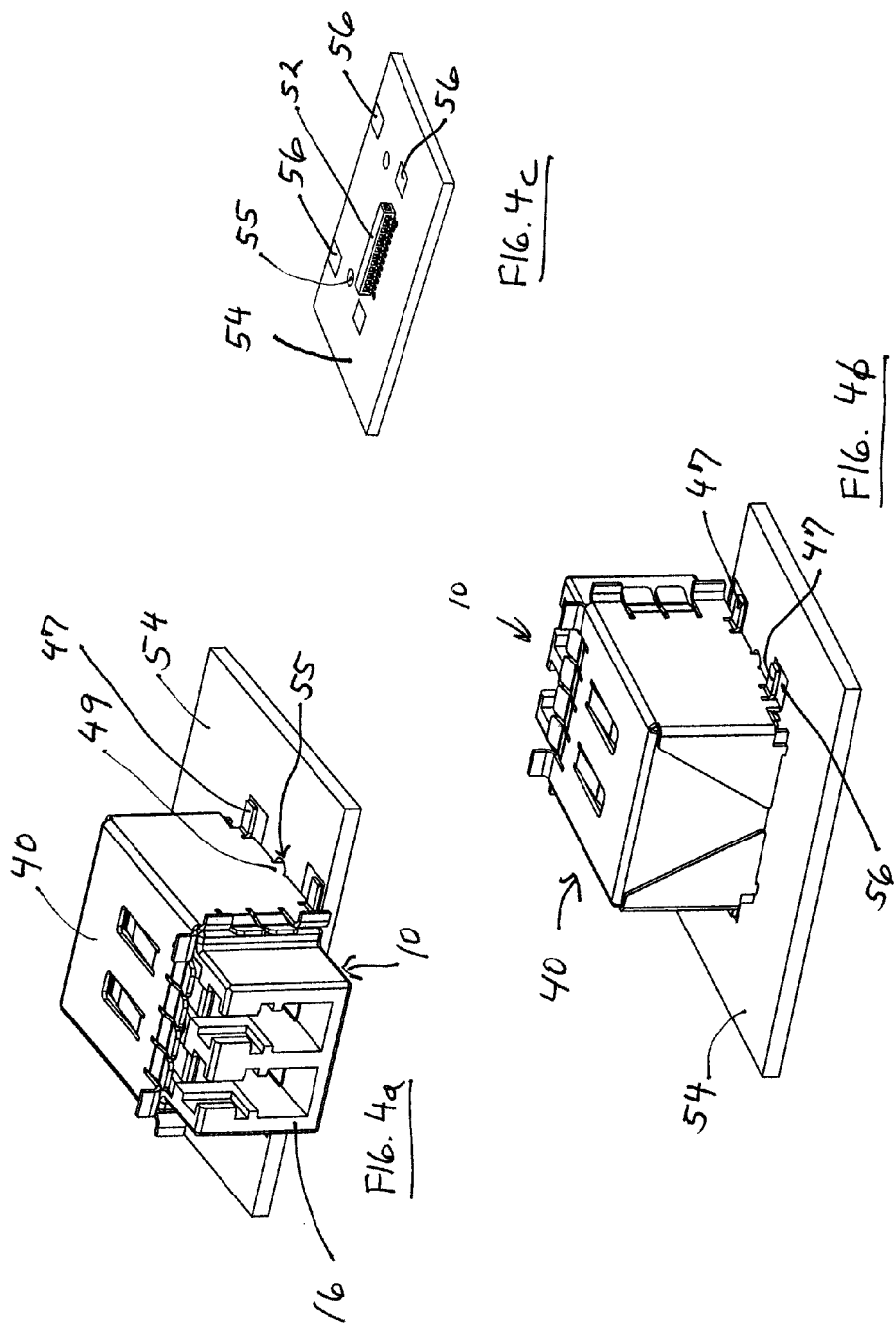

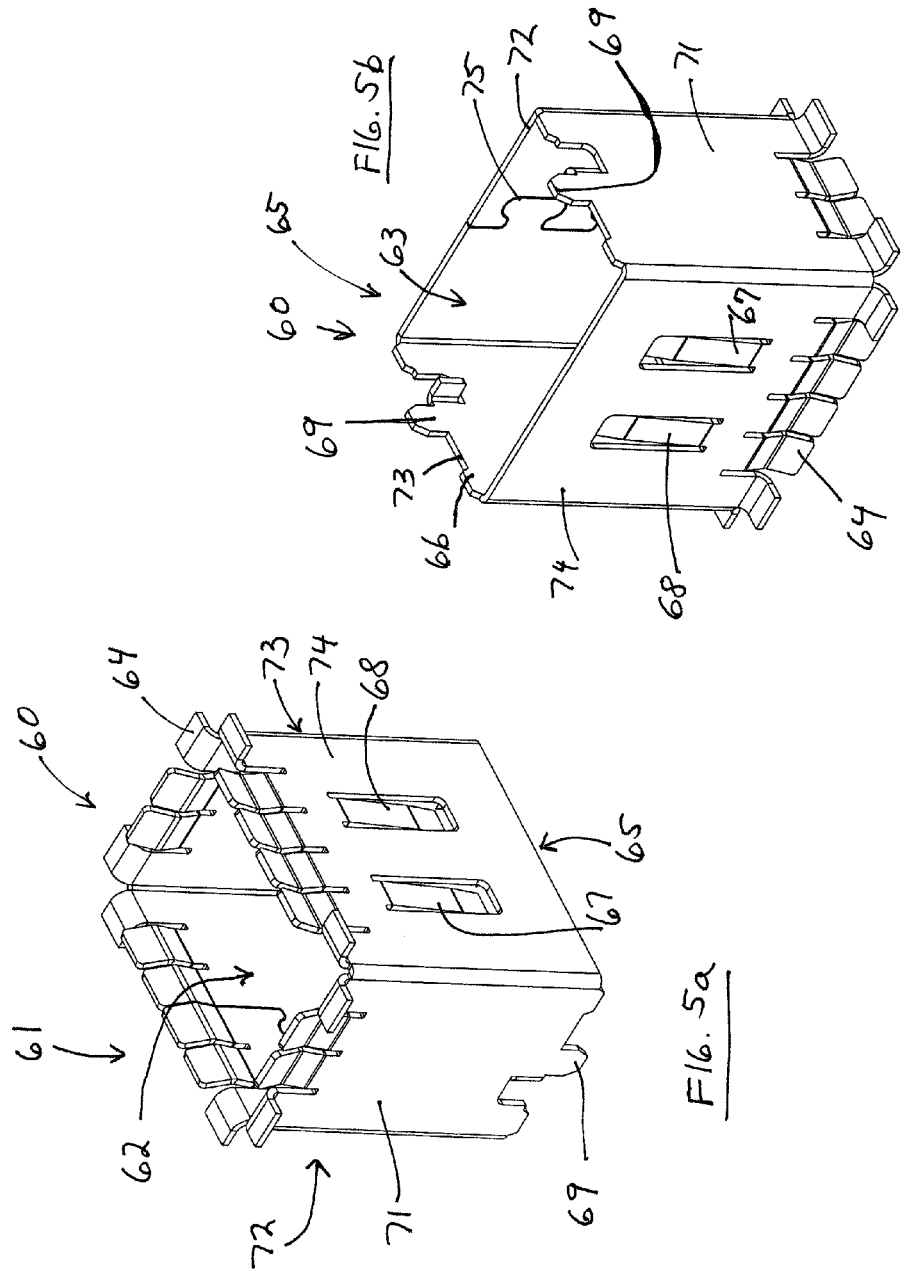

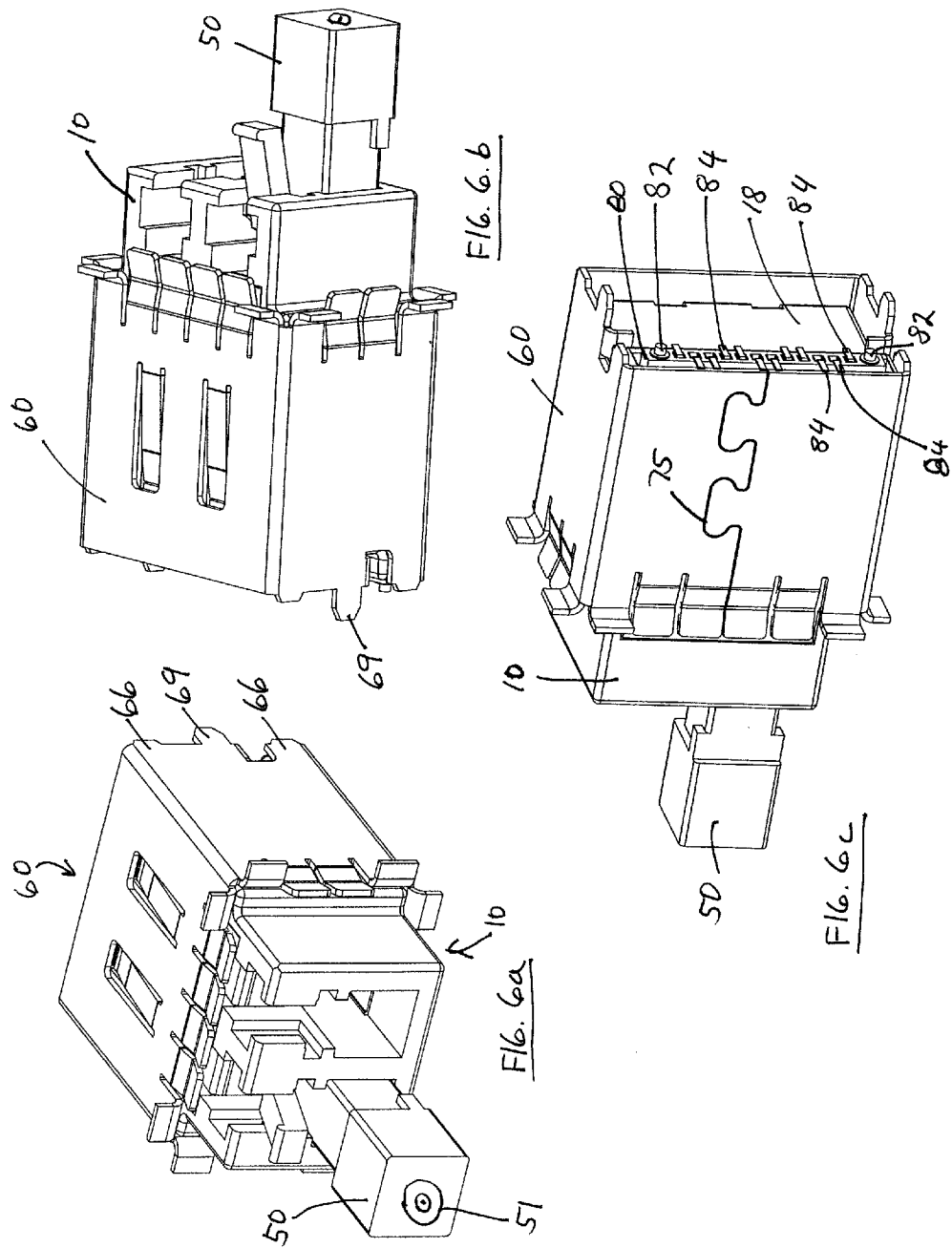

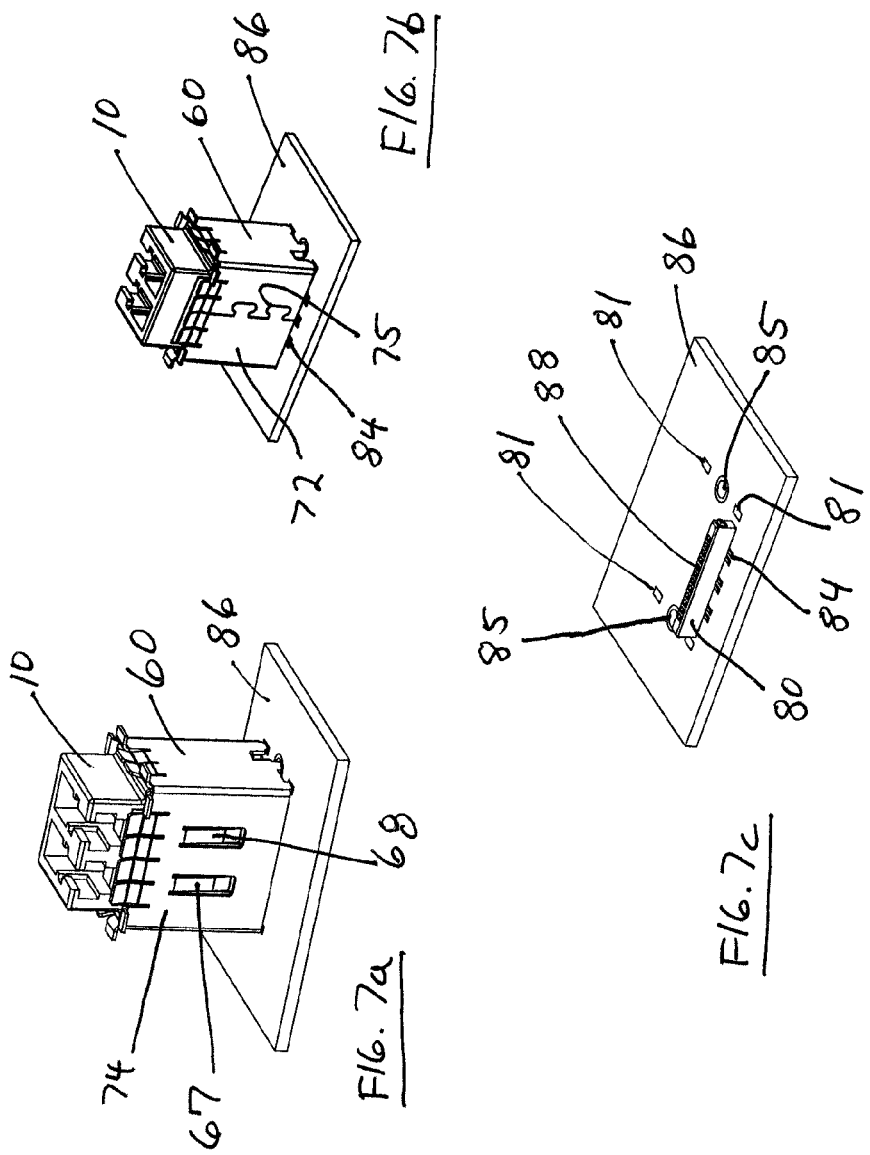

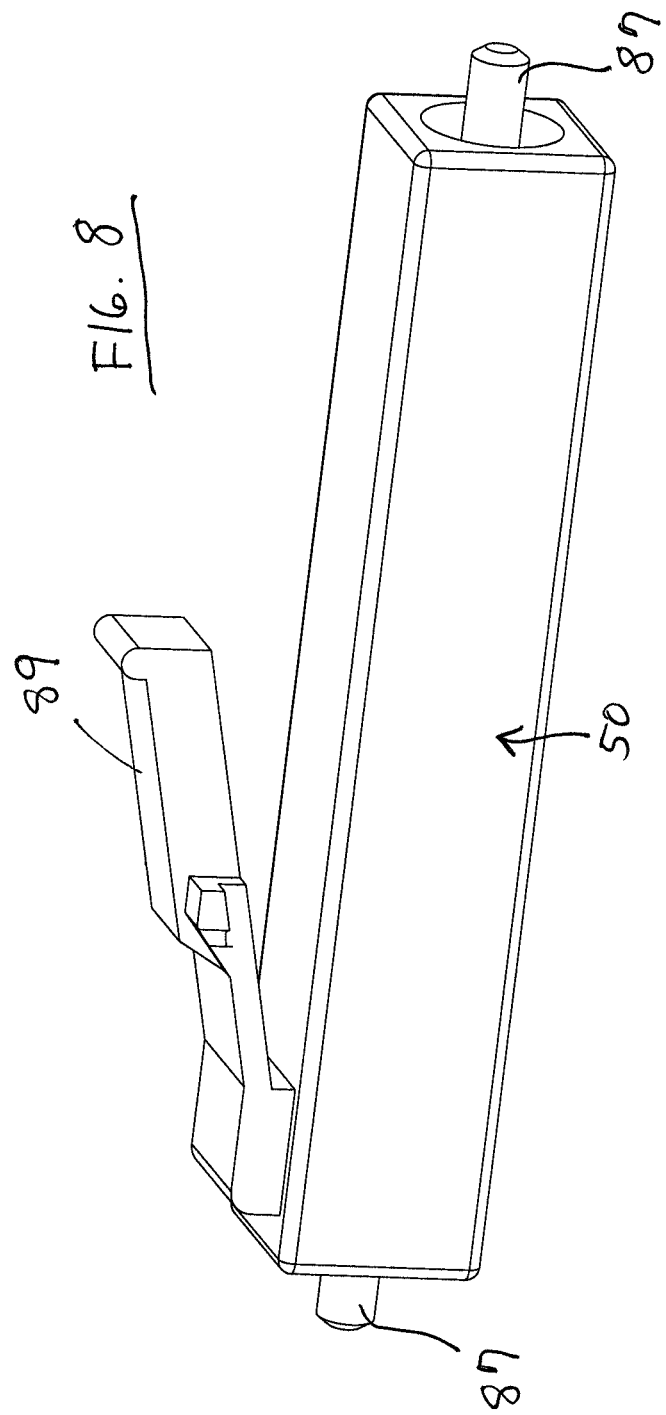

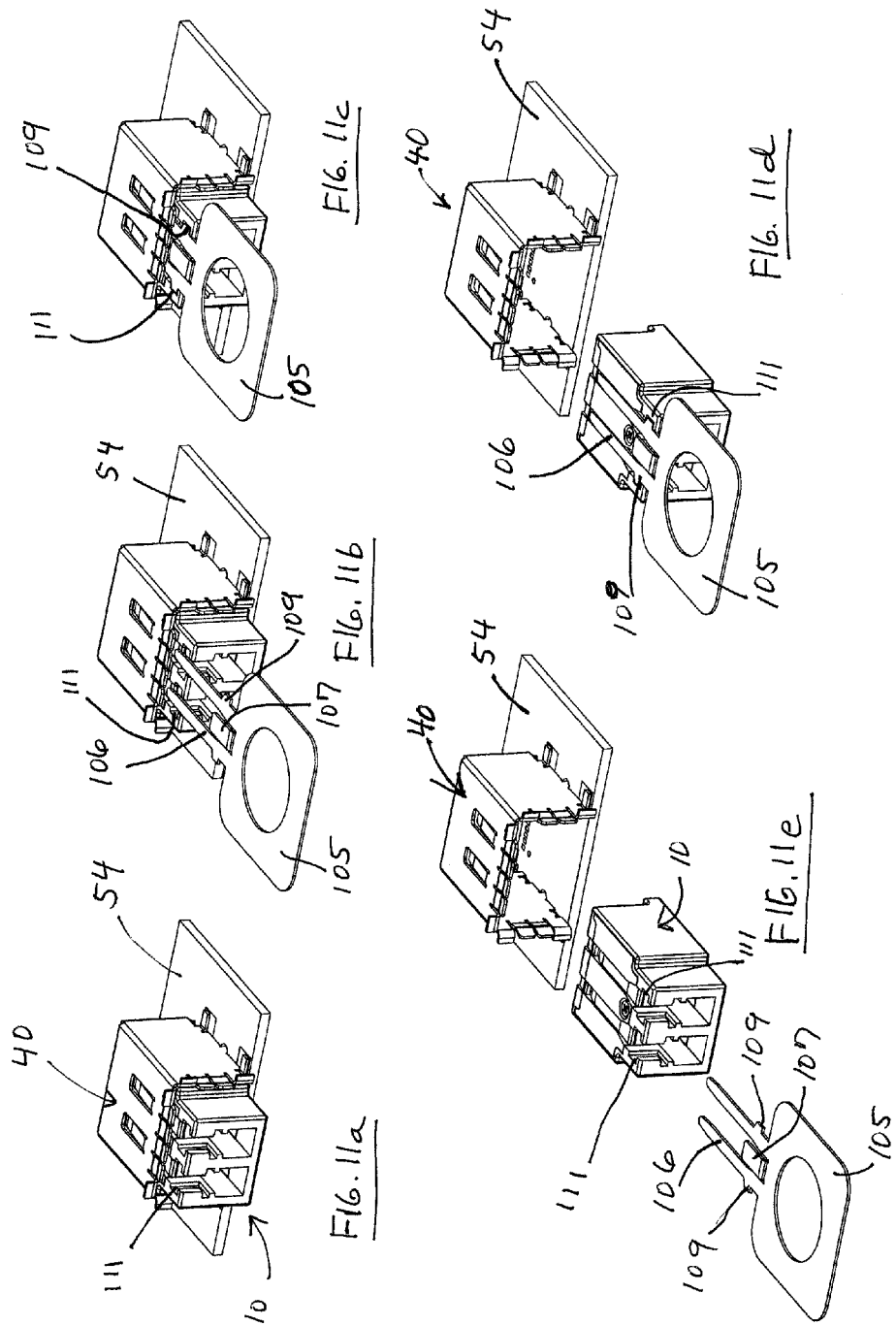

Block Diagrams – Transceiver

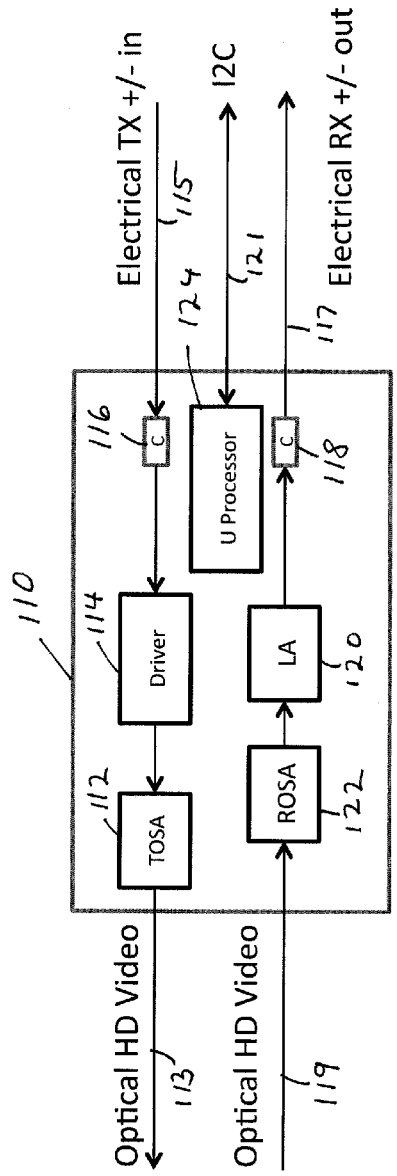

FIG 12a

LA is a Video Pathologically Capable Limiting Amplifier
ROSA is a Video Pathologically Capable Optical Detector and TIA Assembly
Driver is a Video Pathologically Capable VCSEL or Laser Driver
TOSA is a Video Pathologically Capable VCSEL Optical Laser Assembly
uProcessor is a microprocessor
I2C is Digital Diagnostics Interface
C blocks are AC coupling capacitors 4.7 uF or greater Block Diagrams – Dual TX Driver is a Video Pathologically Capable VCSEL or Laser Driver
TOSA is a Video Pathologically Capable VCSEL Optical Laser Assembly
uProcessor is a microprocessor
I2C is Digital Diagnostics Interface
C blocks are AC coupling capacitors 4.7 uF or greater Block Diagrams – Dual RX LA is a Video Pathologically Capable Limiting Amplifier
ROSA is a Video Pathologically Capable Optical Detector and TIA Assembly
uProcessor is a microprocessor
I2C is Digital Diagnostics Interface
C blocks are AC coupling capacitors 4.7 uF or greater

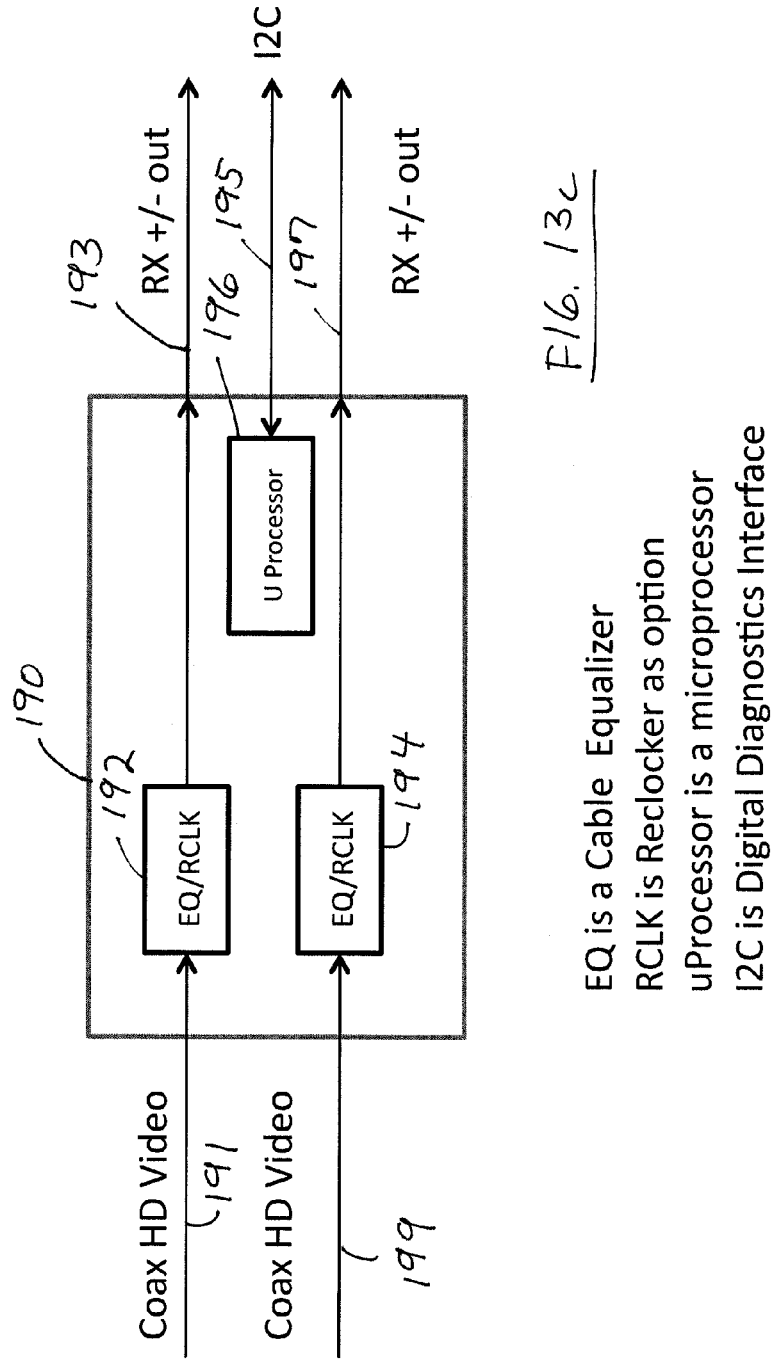

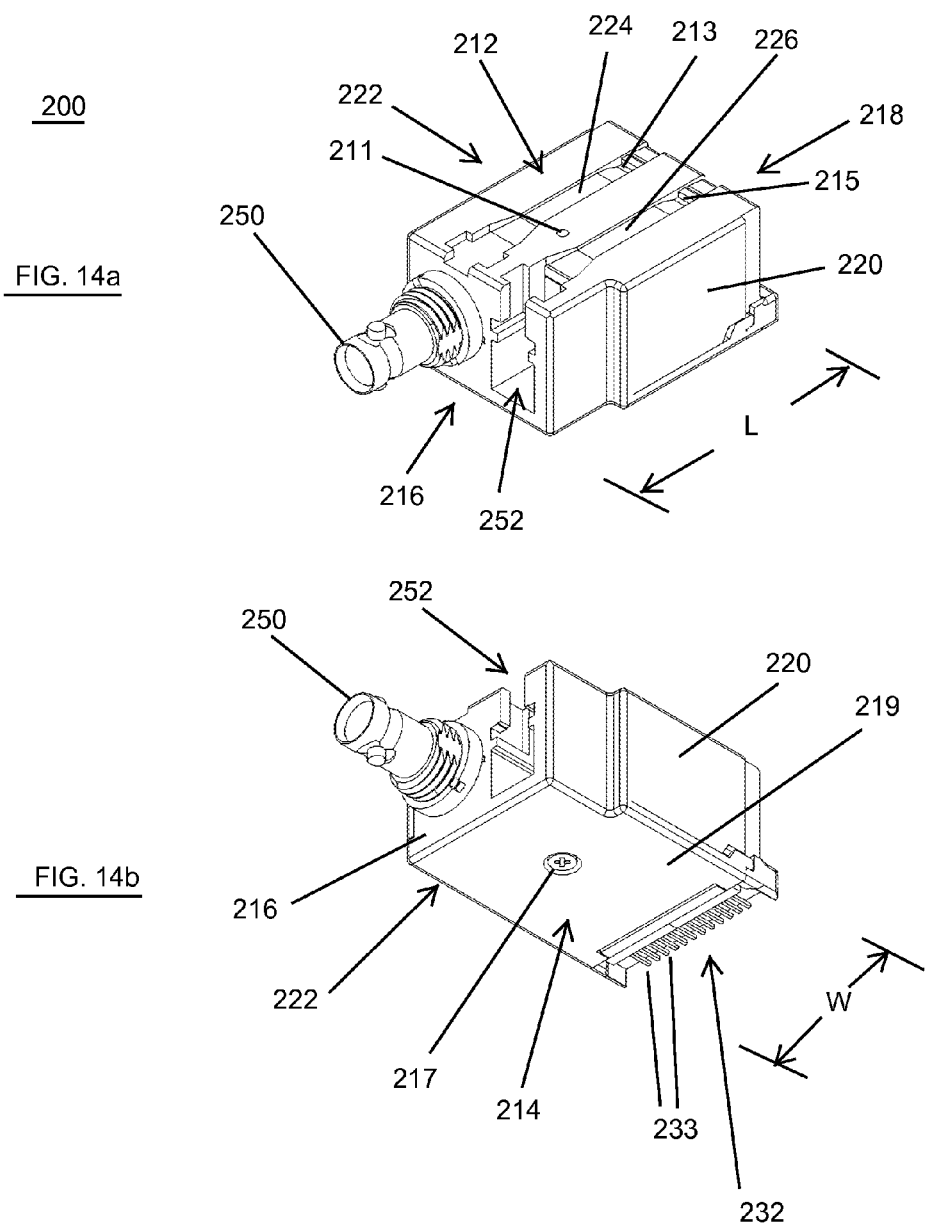

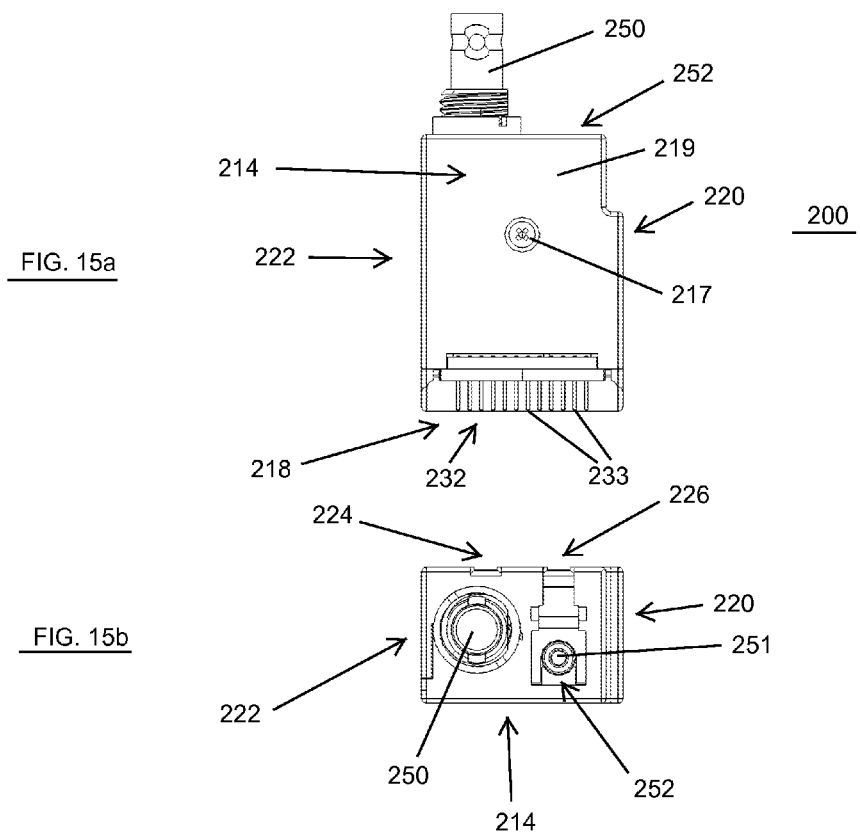
FIG. 15a
FIG. 15b
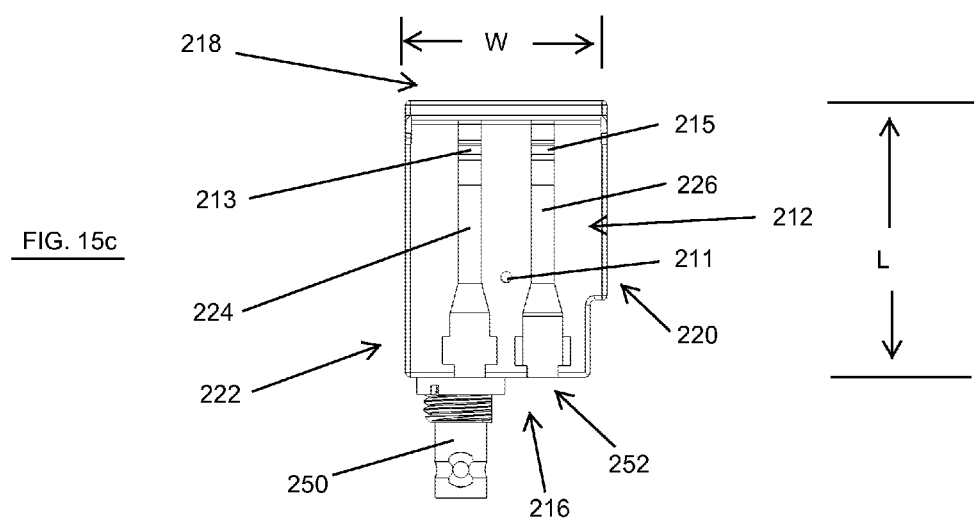
FIG. 15c

MINIATURE PLUGGABLE VIDEO MODULE

REFERENCE TO RELATED APPLICATIONS

This patent application is a continuation-in-part of U.S. patent application Ser. No. 13/343,557, filed on Jan. 4, 2012, entitled "Miniature Pluggable Video Module," which claims priority to U.S. provisional patent application entitled "Miniature Pluggable Video Transceiver," having Ser. No. 61/429,675, filed on Jan. 4, 2011, the entirety of both previously filed applications referenced above being incorporated by reference into the present patent application.

BACKGROUND OF THE INVENTION

1. Field of the Invention

The present invention relates generally to pluggable converter module subassemblies, and more particularly, to pluggable electrical and optical converter modules configured to interface with video systems.

2. Description of Related Art

Conventional optoelectronic transceiver modules are utilized to interconnect circuit cards of communication links and other electronic modules or other subassemblies. Optoelectronic transceiver modules are designed to receive electrical data signals and retransmit these signals as optical signals, and vice versa. Various international and industry standards define the type of connectors used to interface computers to external communication devices, such as modems, network interfaces, and other transceivers. It is desirable to make transceiver modules pluggable so the modules can be easily exchanged. It is also desirable to miniaturize transceiver modules in order to reduce real estate usage on printed circuit boards (PCBs) and increase the port density associated with the network connection (switch boxes, cabling patch panels, wiring closets, computer I/Os, etc.).

Numerous standards are known that define form factors for miniaturized electronic devices, such as the Small Form-Factor Pluggable (SFP) standard that specifies an enclosure 9.8 millimeters in height, 13.5 millimeters in width, and a minimum of 20 electrical input/output connections. The specific standards for SFP transceivers are set forth in the "Small Form-Factor Pluggable (SFP) Transceiver Multisource Agreement (MSA)," dated Sep. 14, 2000, which is hereby incorporated by reference.

Due to current designs and specifications, conventional optoelectronic transceiver modules are not compatible with video circuitry or connectors. For example, video subassemblies typically require different connectors, such as ST or BNC connectors. Moreover, video subassemblies commonly utilize unidirectional signals, and thus do not always require a bidirectional signal interface as provided by transceiver modules. Furthermore, a conventional transceiver module can only be installed into a host device specifically designed to receive that specific transceiver module.

Additionally, a video signal typically includes pathological problems, which a conventional transceiver module would be unable to accommodate. Most transmitters in optical modules have an automatic power control (APC) circuit that keeps the optical power output at a set level. These circuits assume incoming data will have a constant average duty cycle of about 50% over a period of time. Such a time period is usually in the range of 1 millisecond (ms). Since the pathological condition may last for about 50 milliseconds, the laser driver of the optical transmitter would be adjusted too high or too low, depending upon the duty cycle of the signal. A detailed explanation of "Pathological Conditions in Serial Digital Video Systems" can be found in the publication having said title by SMPTE Engineering Guideline, Number EG 34-1999, by the Society of Motion Picture and Television Engineers approved and published Jan. 15, 1999, which is hereby incorporated by reference.

Some progress has been made in developing pluggable modules for video systems. For example, U.S. Pat. No. 7,307,847 ("the '847 patent"), entitled "Pluggable Video Module," having a common inventor with the present application, and hereby incorporated by reference, teaches a pluggable video module having an SFP housing configuration. While the pluggable video module of the '847 patent above enables an SFP module to accommodate some video signals, the '847 patent does not disclose a new, unexpectedly smaller form factor.

Additionally, video computer systems commonly utilize removable circuit cards or printed circuit boards (PCBs) having blind mating card edge connectors that connect to receptacles mounted on a backplane of the video computer system. These removable circuit cards or PCBs can be removed or replaced to upgrade or repair existing circuitry. Conventional pluggable video modules attached to a removable PCB connected to a backplane must be manually unlatched or disconnected to remove the PCB from the backplane. Furthermore, video cables that have been connected to conventional pluggable video modules also must be manually disconnected before circuit cards or PCBs can be disconnected from a backplane.

Accordingly, there is an unmet need for a smaller, pluggable video module that requires less real estate for mounting, and moreover, enables a user to freely remove or replace an installed PCB from a backplane without having to manually unlatch attached pluggable video modules, and also without having to manually disconnect optical or electrical cables attached to the pluggable video modules before removing the PCB from the backplane.

Moreover, there is a need for a smaller pluggable solution that consumes less electrical power than conventional designs, present solution, so the use of VCSELs, in particular, single mode VCSELS, offers reduced power consumption over traditional lasers used for pluggable video modules like SFPs.

Additionally, there is a need for a pluggable video module that automatically connects to the backplane and associated optical and copper wire circuitry during installation of a PCB to a backplane.

ASPECTS AND SUMMARY OF THE INVENTION

According to one aspect of the present invention, a miniature pluggable video module is provided having a reduced form factor resulting in smaller real estate being required to mount the pluggable video module.

Another aspect of the present invention provides a miniature pluggable video module that can be mounted either horizontally or vertically, thus further reducing the real estate necessary to attach the pluggable video module.

Since the miniature pluggable video module of the present invention can be mounted either vertically or horizontally, the pluggable video module provides increased versatility by enabling cables or other types of connectors to be connected to the module from different directions.

A further aspect of the aspect of the present invention enables a removable circuit card to be removed or replaced without having to manually unlatch pluggable video modules attached to the circuit card or backplane.

An additional aspect of the present invention enables a removable circuit card to be removed or replaced without having to manually disconnect or manually reconnect cables from or to pluggable video modules.

Another aspect of the present invention is to eliminate the need for fiber jumper cables between removable circuit cards, computer cards or modular cards and backplanes or equipment chassis of video computer systems.

A further aspect of the present invention is to provide a pluggable video module interface that is interchangeable with various electrical and optical connectors.

Another aspect of the present invention provides a pluggable video module that can be configured as an optical or copper wire transceiver, dual transmitter, or dual receiver.

An additional aspect of the present invention provides a pluggable video module that can be configured to receive or transmit both optical and electrical signals in various input/output combinations.

A further aspect of the present invention provides a pluggable video module that consumes less electrical power for the optical transmitter functions.

Accordingly, one embodiment of the present invention provides a pluggable video module including a housing having a top, a bottom, a front, a back, and first and second sides, said housing having a length between the front and back, and a width between the first and second sides. The housing has a length less than one inch, and a width less than three quarters of an inch, with first and second optical connectors attached to the front of the housing, and a plurality of pin connectors attached to the back of the housing. Circuitry located within the housing handles pathological conditions associated with digital video signals. A transmitter optical subassembly (TOSA) compatible with video pathological conditions is connected to the first optical connector, and a receiver optical subassembly (ROSA) compatible with video pathological conditions is connected to the second optical connector. The ROSA includes a transimpedance amplifier (TIA) and a limiting amplifier (LA) connected to the ROSA that is compatible with video pathological conditions. A laser driver compatible with video pathological conditions is connected to the TOSA, and an I$^2$C digital diagnostic interface is connected to the pin connectors. A microprocessor inside the housing is connected to the I$^2$C digital diagnostic interface, the limiting amplifier and the laser driver.

Another embodiment of the present provides a miniature video duplex transmitter module having a housing with a top, a bottom, a front, a back, and first and second sides. The housing has a length less than one inch, and a width less than three quarters of an inch. First and second optical connectors are attached to the front of the housing, and a plurality of pin connectors are attached to the back of the housing. Circuitry located within the housing handles pathological conditions associated with digital video signals. A first transmitter optical subassembly (TOSA) compatible with video pathological conditions is connected to the first optical connector, and a second transmitter optical subassembly (TOSA) compatible with video pathological conditions is connected to the second optical connector. A first laser driver compatible with video pathological conditions is connected to the first TOSA, and a second laser driver compatible with video pathological conditions is connected to the second TOSA. An I$^2$C digital diagnostic interface is connected to the pin connectors. A microprocessor located within the housing is connected to the I$^2$C digital diagnostic interface and the first and second laser drivers.

A third embodiment of the present invention provides a miniature video duplex receiver module having a housing with a length less than one inch, and a width less than three quarters of an inch. First and second optical connectors are attached to the front of the housing, and a plurality of pin connectors are attached to the back of the housing. Circuitry located within the housing handles pathological conditions associated with digital video signals. A first receiver optical subassembly (ROSA) compatible with video pathological conditions is connected to the first optical connector. The first ROSA includes a first transimpedance amplifier (TIA). A first limiting amplifier (LA) connected to the first ROSA is compatible with video pathological conditions. A second receiver optical subassembly (ROSA) compatible with video pathological conditions is connected to the second optical connector. The second ROSA includes a second transimpedance amplifier (TIA). A second limiting amplifier (LA) is connected to the second ROSA is compatible with video pathological conditions. A I$^2$C digital diagnostic interface is connected to at least one pin of the plurality of pin connectors. A microprocessor located within the housing is connected to the I$^2$C digital diagnostic interface and the first and second limiting amplifiers.

It should be noted that the ports in the above embodiments can be modified to provide additional combinations of optical and copper wire connectors, and additional combinations of transmitters and/or receivers.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is a perspective view the miniature pluggable video transceiver module configured in accordance with a first embodiment of the present invention;

FIG. 1b is a top view of the miniature pluggable video transceiver module shown in FIG. 1a;

FIG. 1c is a bottom view of the miniature pluggable video module shown in FIGS. 1a and 1b;

FIG. 1d is a front view of the video module shown in FIGS. 1a-1c;

FIG. 1e is a perspective view of the bottom and side of the video module shown in FIGS. 1a-1d;

FIG. 1f is a side view of the video module shown in FIGS. 1a-1e;

FIG. 2a is a perspective view of the top and front of a cage for horizontally mounting the miniature pluggable video module shown in FIGS. 1a-1f;

FIG. 2b is a perspective view of the top and back of the cage shown in FIG. 2a;

FIG. 3a is a perspective view of the front and top of the cage shown in FIGS. 2a and 2b and retaining the video module shown in FIGS. 1a-1f;

FIG. 3b is a perspective view of the bottom and back of the cage shown in FIGS. 2a, 2b and 3a and retaining the video module shown in FIGS. 1a-1f;

FIG. 4a is a perspective view of the pluggable video module and cage shown in FIGS. 3a and 3b mounted horizontally to a printed circuit board (PCB);

FIG. 4b is a perspective view of the back of the cage, PCB, and the video module shown in FIG. 4a;

FIG. 4c is a perspective view of a horizontal multiple pin receptacle mounted to a PCB for horizontally connecting the miniature pluggable video module shown in FIGS. 1a-1f;

FIG. 5a is a perspective view of the front of a cage for vertically mounting the miniature pluggable video module shown in FIGS. 1a-1f;

FIG. 5b is a perspective view of the back of the cage shown in FIG. 5a for vertically mounting the video module shown in FIGS. 1a-1f;

FIG. 6a is a perspective view of the front of the cage shown in FIGS. 5a and 5b for vertically mounting the video module shown in FIGS. 1a-1f;

FIG. 6b is a perspective view of the side of the cage shown in FIGS. 5a and 5b vertically mounting the video module shown in FIGS. 1a-1f;

FIG. 6c is a perspective view of the bottom of the cage shown in FIGS. 5a and 5b for vertically mounting the video module shown in FIGS. 1a-1f;

FIG. 7a is a perspective view of the top of the cage shown in FIGS. 6a-6c mounted to a printed circuit board and vertically mounting the video module shown in FIGS. 1a-1f;

FIG. 7b is a perspective view from a different angle of the top of the cage shown in FIGS. 6a-6c mounted to a printed circuit board and vertically mounting the video module shown in FIGS. 1a-1f;

FIG. 7c is a perspective view of the vertical pin receptacle mounted to a printed circuit board for vertically connecting the video module shown in FIGS. 1a-1f;

FIG. 8 is a perspective view of an LC extension connector to be received by the video module shown in FIGS. 1a-1f;

FIGS. 11a-11e illustrate a removal tool configured in accordance with the present invention being utilized to unlock the miniature video module mounted horizontally;

FIG. 12a is a block diagram of an optical transceiver video module configured in accordance with the present invention;

FIG. 13c is a block diagram of a dual copper wire receiver video module configured in accordance with the present invention;

FIG. 14a is a perspective view of a miniature pluggable video transceiver module configured in accordance with a further embodiment of the present invention;

FIG. 14b is a perspective view of the bottom and the front of the miniature video transceiver module shown in FIG. 14a;

FIG. 15a is a bottom view of the miniature pluggable video transceiver module shown in FIGS. 14a and 14b;

FIG. 15b is a front view of the miniature pluggable video transceiver module shown in FIGS. 14a, 14b, and 15a; and FIG. 15c is a top view of the miniature pluggable video transceiver module shown in FIGS. 14a, 14b, 15a, and 15b.

DETAILED DESCRIPTION OF THE PREFERRED EMBODIMENT

Figure 9A:
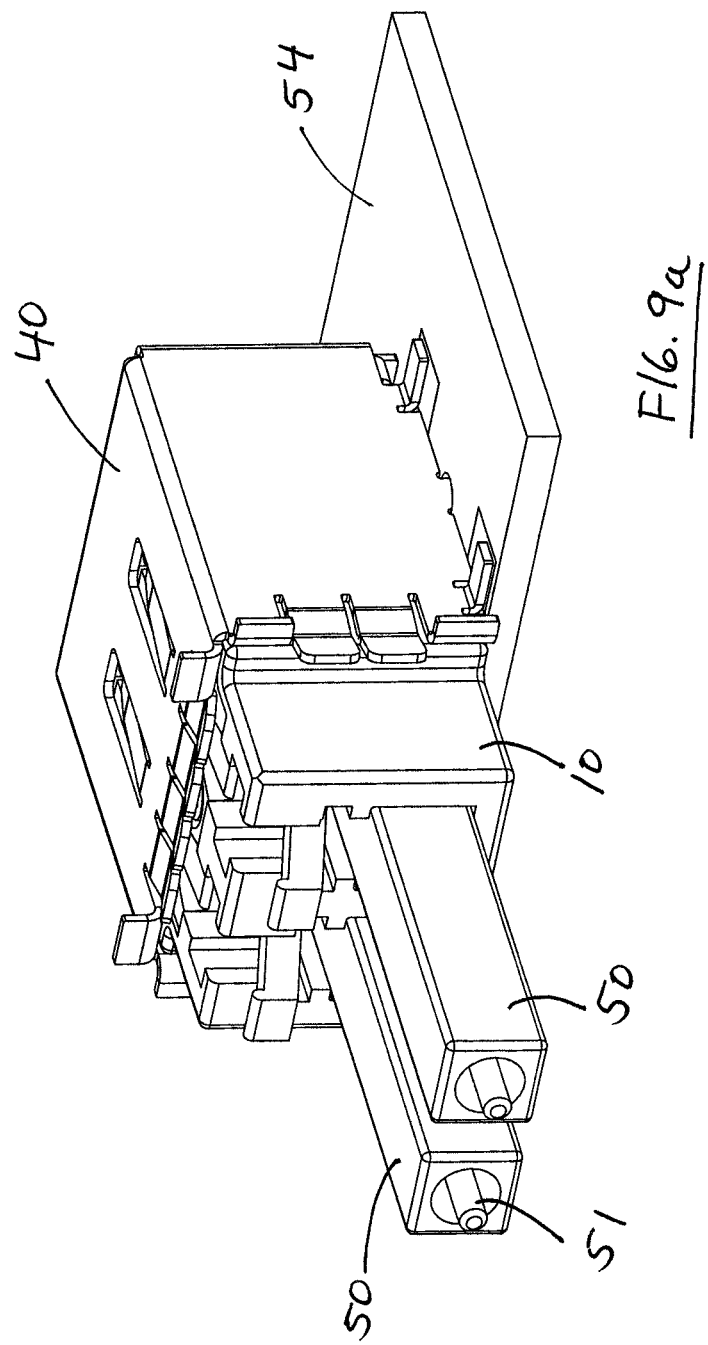
FIG. 9a is a perspective view of the video module horizontally mounted to a PCB and including the LC extension connectors within the optical receptacles of the video module.

Referring now to the drawings, FIG. 1a illustrates a perspective view of a miniature pluggable video module 10 configured in accordance with a first embodiment of the present invention. The housing of the module 10 includes a top 12, a bottom 14, a front 16, and a back 18. The housing of the module 10 also includes sides 20,22 between the front 16 and back 18. The module 10 has a width (W) (FIG. 1b) between the two sides 20,22, and a length (L) (FIG. 1f) between the front 16 and back 18.

FIG. 1b is a top view of the module 10 showing the top 12 of the module 10 having guide channels or channels 24,26. The channels 24,26 include dips 13,15 in the rear for receiving compression tabs (FIG. 2a) to secure the module 10 within a mounting cage. Receptacles 28,30 also are illustrated. It should be noted that while the illustrated receptacles 28,30 are configured for optical receptacles, the receptacles 28,30 can be configured for wire or copper wired connectors in different embodiments. Similarly, one of the receptacles 28,30 can be configured for a copper wire connector, and one of the receptacles 28,30 can be configured for an optical connector. A top mounting screw 11 is located in the top 12 of the module 10. The top is preferably constructed of a single element, such as molded plastic or metal. The outer housing of the module 10 is preferably electrically conductive to discharge static charge during insertion into a mounting cage, which can be achieved by constructing the housing out of metal or coating a plastic housing with conductive material. The width W of the module 10 between the sides 20,22 is preferably less than 0.75 inches.

FIG. 1c is a bottom view of the module 10 showing the bottom 14. A plurality of pin connectors 32 is illustrated at the back 18 of the module 10. A bottom mounting screw 17 is located in the bottom 14 of the module 10 for securing a bottom panel 19 to the bottom 14 of the module 10. The plurality of pin connectors 32 having pins 33 is located at the back 18 and bottom 14 of the module 10. The pins 33 extend parallel to the bottom panel 19 of the module 10, enabling the module 10 to be pluggably connected to a multiple pin receptacle, for example, located on a printed circuit board within a mounting cage for receiving pluggable modules.

FIG. 1d is a front view of the module 10 showing receptacles 28,30 which contain optical ports or optical connectors 34,36, respectively. The optical ports 34,36 preferably use single mode (SM) vertical-cavity surface-emitting lasers (VCSELs) if they are optical outputs to reduce power consumption. Of course, the optical ports 34,36 can be configured to be both optical inputs. Similarly, the optical ports 34,36 may be a transceiver combination having one optical input and one optical output. In another embodiment the receptacles 28,30 can contain copper wire connectors.

FIG. 1e shows a perspective view of the bottom 14, side 20, and back 18 of the module 10. FIG. 1e also provides a good view of the multiple pin connector 32 having pins 33.

FIG. 1f is a side view of the side 20 of the module 10. A length L is shown between the front 16 and the end of the back 18 of the module 10. The length L is preferably less than one inch.

FIG. 2a is a perspective view of the front of a mounting cage 40 for horizontally mounting the pluggable video module 10. The cage 40 has an opening 48 at the front 21 of the cage 40 which is surrounded by wing tabs 43 that guide a pluggable module into the opening 48 during insertion. The top 42 of the cage 40 includes compression tabs 44,46 that are formed as cut-outs on the top 42 of the cage that are sized to fit into the channels 24,26 of the module 10 during insertion to guide and secure the module 10 within the cage 40 when the ends of the compression tabs 44,46 drop into the dips 13,15 of the channels 24,26. Mounting wings 47 are located on the bottom of the cage 40 for mounting and stabilizing the cage 10 on a printed circuit board or other mounting surface. Mounting guides 49 fit into corresponding apertures of a PCB to correctly position the cage 40 during mounting.

FIG. 2b is a perspective view of the back 41, the side 45, and the top 42 of the cage 40 shown in FIG. 2a. FIG. 2b illustrates a back view of the compression tabs 44,46 and wing tabs 43. The mounting wings 47 and mounting guides 49 also are illustrated. The horizontal mounting cage 40 is preferably constructed of a conductive material, such as metal. The horizontal mounting cage 40 is currently sold by the assignee of this application, Advanced Fiber Products, LLC, in Des Plaines, Ill., as item number MCUBE-HCG.

FIG. 3a is a perspective view from the front 16 of the pluggable video module 10 inserted within the horizontal mounting cage 40. An LC optical connector extension 50 is shown located with in the optical receptacle 28 of the module 10. This embodiment of the extension connector 50 includes male LC optical fiber connecters 51 located at opposing ends of the extension connector 50.

FIG. 3b is a perspective view from the bottom 14 of the pluggable video module 10 inserted within the horizontal mounting cage 40. A horizontal pin receptacle 52 having multiple slots for receiving electrical connector pins is shown attached to the plurality of pins 32 on the back 18 and bottom 14 of the module 10. Electrical connection leads 53 are shown extending from the horizontal pin receptacle 52 which are to be connected to a mounting surface such as a PCB. The horizontal pin receptacle 52 includes mounting posts 57 for to be inserted into apertures on a PCB for accurately positioning and mounting the horizontal pin receptacle 52 to a PCB.

FIG. 4a shows a perspective view of the front 16 of the module 10 installed within the horizontal mounting cage 40, which is mounted to a PCB 54 by gluing or soldering the mounting wings 47 to the PCB 54. Apertures 55 in the PCB 54 receive the mounting guides 49 to accurately position the cage 40 on the PCB 54.

FIG. 4b shows perspective view of the back 41 of the cage 40 and the module 10 installed within the cage 40, which is mounted to the PCB 54.

FIG. 4c shows the horizontal pin receptacle 52 mounted to the PCB 54. The cage 40 is not shown mounted over the horizontal pin receptacle 52 in order to provide a better view of how the horizontal pin receptacle 52 is mounted to a PCB 54. Apertures 55 are located in the PCB for receiving the mounting guides 49 to accurately position the cage 40 on the PCB 54 during mounting. Pad 56 on the PCB 54 function to receive the mounting wings 47 and further assist in accurately positioning and securing the cage 40 to the PCB 54. The horizontal pin receptacle 52 is currently sold by the assignee of this application, Advanced Fiber Products, LLC, in Des Plaines, Ill., as item number MCUBE-HCON.

FIG. 5a is perspective view of an opening 62 at the top 61 of a vertical mounting cage 60 configured in accordance with the present invention. The cage 60 includes an opening 62 for receiving the module 10 to mount the module 10 in a vertical position. Wing tabs 64 surround the opening 62 to help guide the module 10 into the opening 62 during insertion of the module 10. The vertical mounting cage 60 has four later sides 71,72,73,74, with compression tabs 67,68 being formed out of side 74, similar to compression tabs 44,46 in horizontal mounting cage 40. The bottom 65 of the vertical mounting cage 60 is to be secured to a PCB.

FIG. 5b is a perspective view of the bottom 65 of the vertical mounting cage 60. The bottom 65 includes an opening 63 to be secured around a vertical pin receptacle 80 (FIG. 7c). Mounting guides 69 located on the bottom of the cage 60 are inserted into apertures on a PCB to accurately position and mount the cage 60 to a PCB. Side 72 includes interlocking ends 75 forming the cage 60 by locking the ends 75 together to form side 72. The vertical mounting cage 60 is currently sold by the assignee of this application, Advanced Fiber Products, LLC, in Des Plaines, Ill., as item number MCUBE-VCG.

FIG. 6a is a perspective view of the top or front 61 of the vertical mounting cage 60 retaining the module 10, wherein receptacle 28 contains an LC connector extension 50 configured in accordance with the present invention. Mounting guides 69 and mounting tabs 66 are shown on the bottom 65 of the cage 60.

FIG. 6b is a perspective view of the side of the vertical mounting cage 60 retaining the module 10, wherein receptacle 28 contains an LC connector extension 50 configured in accordance with the present invention.

FIG. 6c is a perspective view of the cage 40, module 10, and connector extension 50 shown in FIGS. 6a and 6b. The interlocking ends 75 also are clearly illustrated. Additionally, a vertical pin receptacle 80 configured in accordance with the present invention also is shown contained within the cage 40 and connected to the plurality of pin connectors 32 on the back 18 of the module 10. The vertical pin receptacle 80 includes mounting posts 82 for to be inserted into apertures on a PCB for accurately positioning and mounting the vertical pin receptacle 80 to a PCB.

In accordance with the present invention, finger leads 84 of the vertical pin receptacle 80 extend in opposing directions in order to stabilize the vertical pin receptacle 80 when mounted to a PCB.

FIG. 7a is perspective view of the vertical mounting cage 60 containing the module 10 mounted to a PCB 86. Side 74 including compression tabs 67,68 is clearly shown. The bottom 65 of the vertical mounting cage 60 is shown mounted to the PCB 86, and the opening 63 at the top 61 of the cage 60 is shown retaining the module 10.

FIG. 7b is a perspective view of the vertical mounting cage 60, retaining module 10, and the PCB 86 shown in FIG. 7a, wherein the side 72 is clearly shown with the interlocking ends 75.

FIG. 7c is a perspective view of the vertical pin receptacle 80 having multiple sockets 88 for receiving pins 33 of the module 10 during insertion into the cage 60. The vertical pin receptacle 80 is stabilized on the PCB 86 by alternating the direction the finger leads 84 electrically connected to the sockets 88 on the PCB 86. Apertures 85 located within the PCB 86 receive the mounting guides 69 to accurately position the cage 60 during mounting on the PCB 86. Pads 81 on the PCB 86 function to further secure and accurately position the bottom 65 of the cage 60 to the PCB 86 during mounting. The vertical pin receptacle 80 is currently sold by the assignee of this application, Advanced Fiber Products, LLC, in Des Plaines, Ill., as item number MCUBE-VCON.

FIG. 8 illustrates a perspective view the LC connector extension 50 shown in FIGS. 3a, 6a, 6b and 6c. The LC connector extension 50 has male optical fibers connectors 87 at opposing ends of the longitudinal body of the LC connector extension 50. An LC depressible latch lever 89 is attached to the LC connector extension 50 to secure the extension 50 within an optical receptacle or connector. It should be noted that while the illustrated connecter extension is a male ended LC optical connector, the connecter extension could use a combination of male and female connectors at opposing ends, or moreover, instead, could have cable wire or copper wire male or female connectors at each end, or a combination of any of the above at opposing ends.

FIG. 9a is a perspective view of the horizontal cage 40 mounted to PCB 54 and retaining the module 10. LC connector extensions 50 are connected to the receptacles 28,30 of the module 10.

Figure 9B:
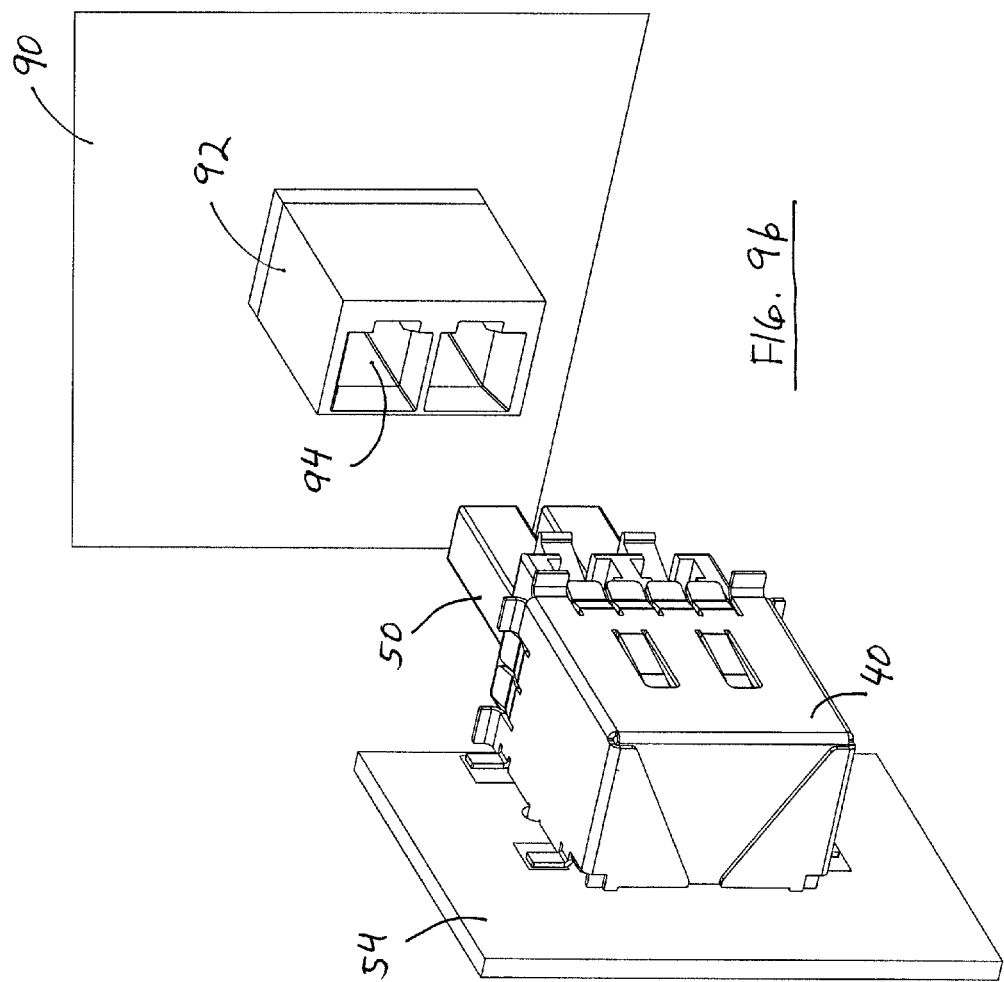
FIG. 9b is a perspective view of the horizontally mounted module in FIG. 9a being connected to or removed from a receptacle on a backplane in accordance with the present invention.

FIG. 9b illustrates the PCB 54, cage 40, module 10 and connector extensions 50 shown in FIG. 9a. Also illustrated is a backplane 90 including a receptacle 92 having ports or sockets 94. FIG. 9b illustrates the connector extensions 50 being inserted or removed from the sockets or ports 94.

In accordance with the present invention, the mounting of the PCB 54 into a card connector slot or receptacle will hold the connector extensions 50 securely within receiving ports 94 without needing to be latched into the ports 94. This design enables a user to replace the PCB 54 or a computer card or circuit card without having to manually unlatch the connector extensions 50 from the socket 94. It should be noted that the outward extending ends of the connector extensions 50 do not include a latching mechanism 89. Furthermore, the connector extensions 50 and socket 92 of receptacles 92 can be configured to accommodate various combinations of copper or cable wire connectors or optical connectors, and/or various combinations of male or female connectors.

Figure 9C:
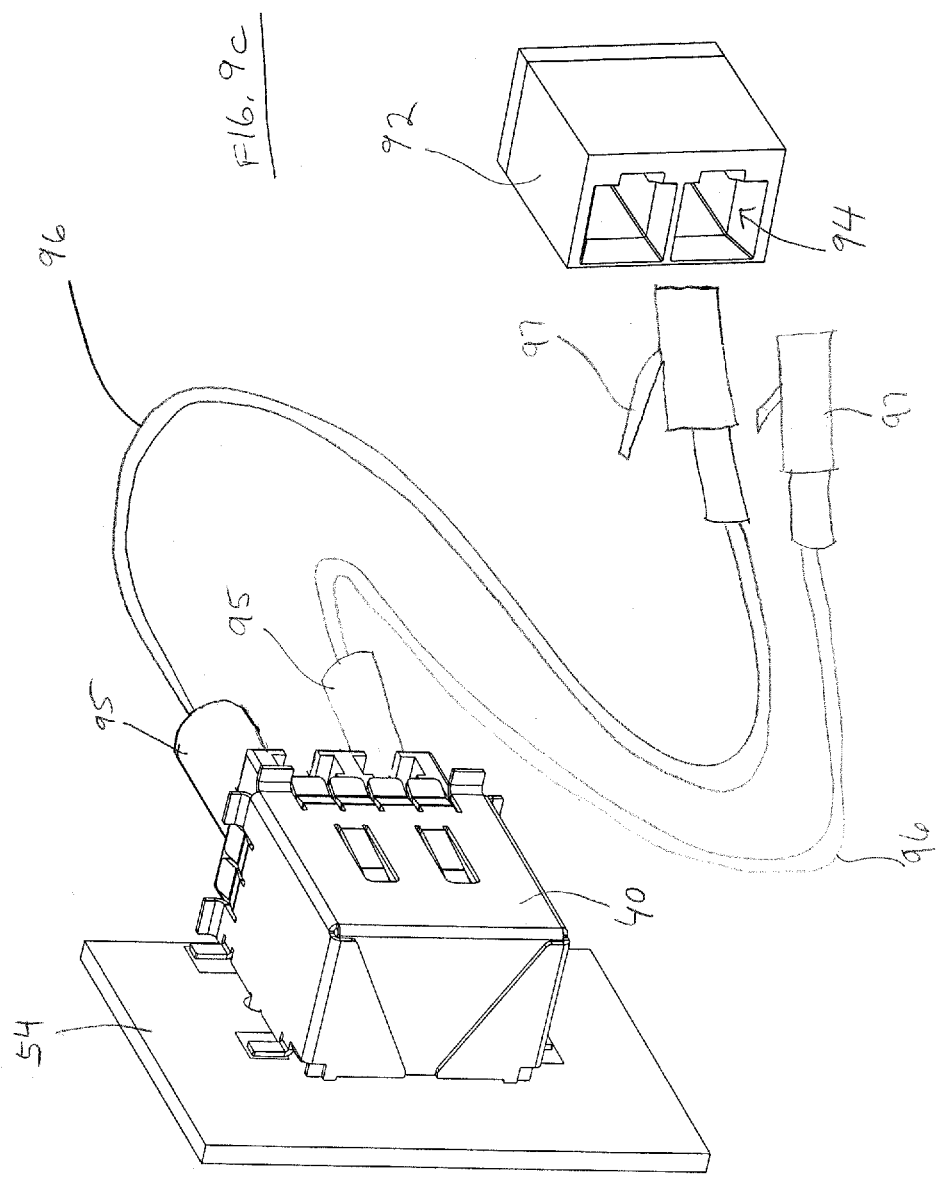
FIG. 9c is a perspective view of the horizontally mounted module in FIG. 9a being connected to or removed from a receptacle on a backplane in accordance with the present invention using pigtail connectors.

FIG. 9c illustrates another embodiment of the present invention. The PCB 54, cage 40 and module 10 are connected to the receptacle 92 using pigtails 96 having permanently attached connectors 95 to the module 10. The pigtails 96 and permanently attached connector ends 95 can be configured for optical fiber or copper wire connectors. Similarly, two detachable connector ends 97, which are illustrated in this embodiment as LC optical connectors, can be optical or copper wire connector ends, and are inserted and attached to receptacle 92 having socket 94. The sockets 94 also can be configured for optical or copper wire connectors, and can be either inputs or outputs. The receptacle 92 can be replaced with another module 10 in other embodiments. The present invention enables a user to mix and match optical/copper connections and inputs/output as desired for each specific need.

Figure 9D:
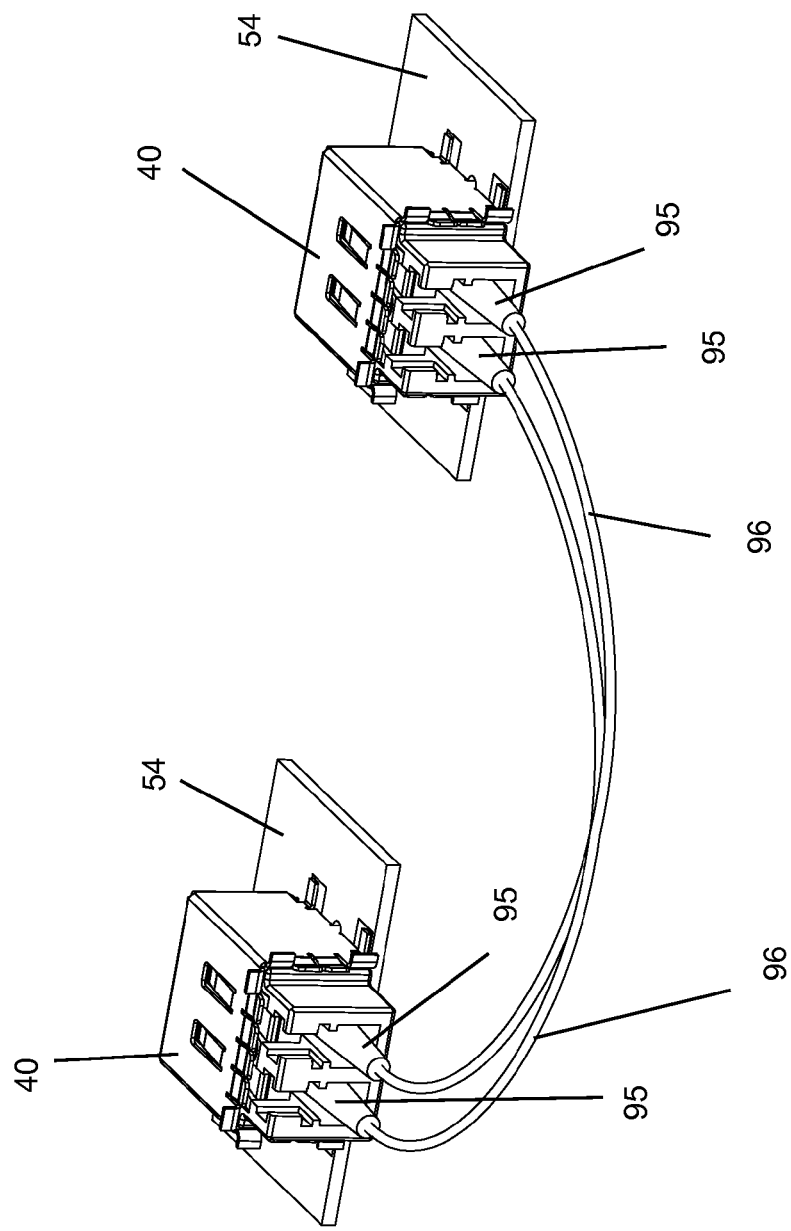
FIG. 9d is a perspective view of the horizontally mounted module in FIG. 9a being connected to another horizontally mounted module in FIG. 9a in accordance with the present invention, such that the optical cables are permanently connected to the video modules and constitute an active cable assembly when the two video modules are removed from the horizontal mounting cages.

FIG. 9d illustrates two modules 10 connected by pigtail connectors 96 whose opposing ends 95 are permanently attached to opposing modules 10. Users can connect different computer components or computer cards by plugging in each of the modules 10 into cages 40 located on different cards 54. The opposing ends 95 can be either optical or copper connections in different embodiments, and the modules 10 can be configured for either optical or wired connectors. Similarly, the modules 10 can be transceivers, duel transmitters, or dual receivers.

Figure 10:
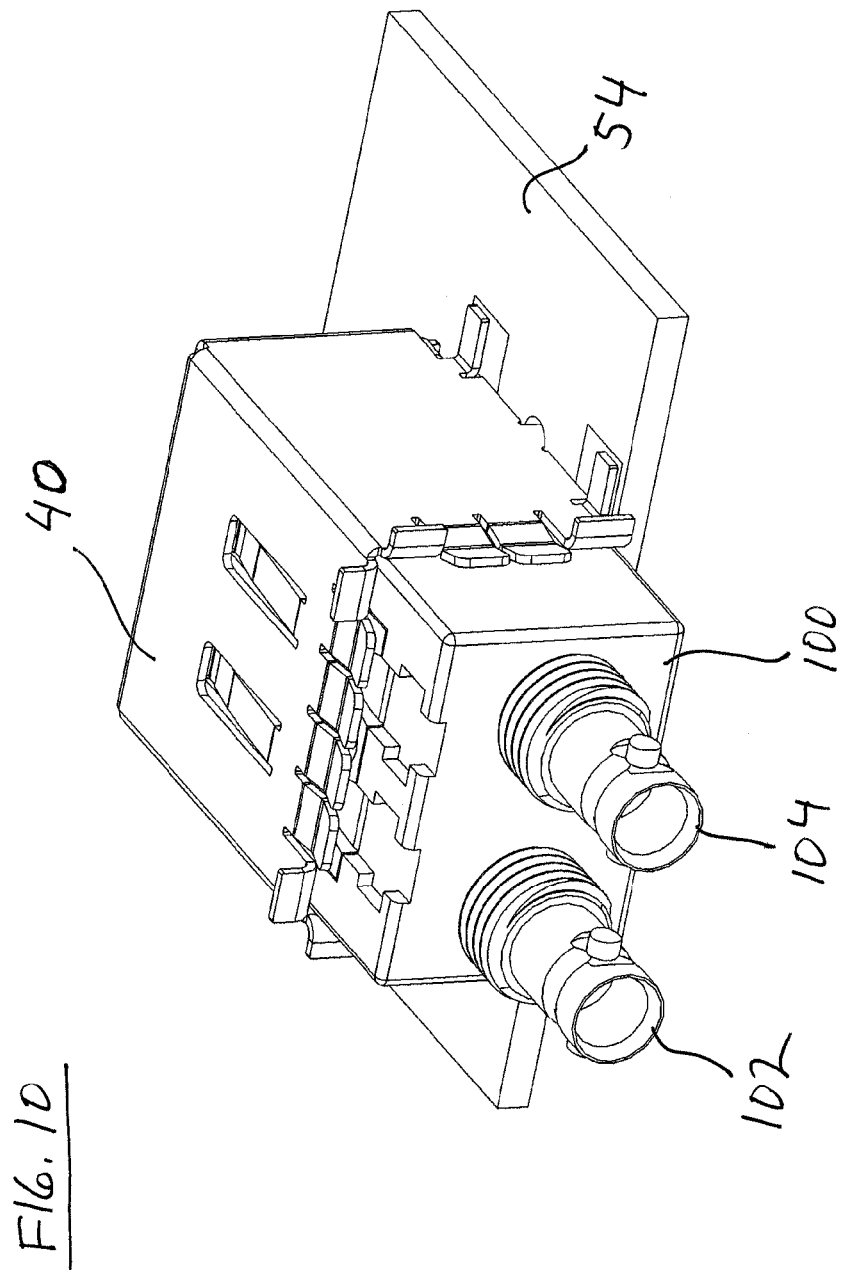
FIG. 10 illustrates a miniature video module of the present invention using a miniature BNC connector.

FIG. 10 illustrates the PCB 54 and cage 40 shown in FIG. 9, wherein a module 100 is configured in accordance with the present invention has replaced the optical ports of module 10 with copper wire connectors, which can be any combination of inputs or outputs. The illustrated copper wire connectors are mini BNCs 102,104. Other types of wire or copper connectors can be used, such as simplex STs.

FIGS. 11a-11e illustrate the sequential steps of removing the module 10 from the cage 40 using a removal tool 105. The removal tool 105 similarly functions to unlatch and remove a module 10 from the vertically mounting cage 60. The removal tool 105 includes two fingers 106 that are inserted into the channels 24,26 of the module 10 to lift the compression tabs 44,46 out of the dips 13,15, and unlatch the module 10 from the cage 40 so that the module 10 can be unplugged and removed from the cage 40.

The removal tool 105 include a raised tab 107 that functions as a stop guard to position the removal tool 105 at the proper location within the channels 24,26 to lift the compression tabs 44,46 from the dips 13,15 without damaging the compression tabs 44,46. The fingers 106 also include tabs 109 that fit into notches 111 in the module 10 to enable the removal tool to grab and remove the module 10 from the cage 40 after the fingers 106 unlatch the compression tabs 44,46.

FIG. 11b shows the fingers of the removal tool 105 being inserted into the channels 24,26 of the module 10. FIG. 11c shown the fingers 106 moving under the compression tabs 44,46 and lifting the compression tabs 44,46 out of the dips 13,15 in the channels 24,26, thus unlatching the module 10 from the cage 40 so that the module 10 can be removed from the cage 40. FIG. 11c also shows the tabs 109 fitting into slots 111 in the module 10, enabling the removal tool 105 to lock onto the module 10 and remove the module 10 from the cage 40.

FIG. 11d shows the removal tool 105 pulling the module 10 out of the cage 40, wherein the tabs 109 of the fingers 107 are fitted into the slots 111 of the module 10 to enable the removal tool to lock onto the module 10 and pull it out of the cage 40. FIG. 11e illustrates the removal tool 105 being separated from the module 10 after the module 10 is removed from the cage 40.

FIG. 12a is a block diagram 110 of a miniature pluggable video transceiver configured in accordance with the present invention, such as module 10. The block diagram illustrates an optical high definition (HD) video output 113 connected to a TOSA 112, which is a video pathological capable VCSEL optical laser assembly. The TOSA 112 is driven by a video pathological capable VCSEL or laser driver 114. An AC coupling capacitor pair 116 having a capacitance of 4.7 microfarads or greater is connected to the driver 114 and receives electrical inputted video signal from a copper connector 115.

Similarly, the optical HD video input 119 is connected to a ROSA 122, which is a video pathological capable optical detector and TIA assembly. The ROSA 122 is connected to a LA 120, which is a video pathological capable limiting amplifier. The LA 120 is connected to an AC coupling capacitor pair 118 having a capacitance of 4.7 microfarads or greater, which then outputs video to a copper connector 117. The transceiver block diagram includes a controller 124 which is connected to an I²C digital diagnostic interface 121. The controller 124 can be a digital controller or microprocessor, or other type of system controller.

Figure 12B:
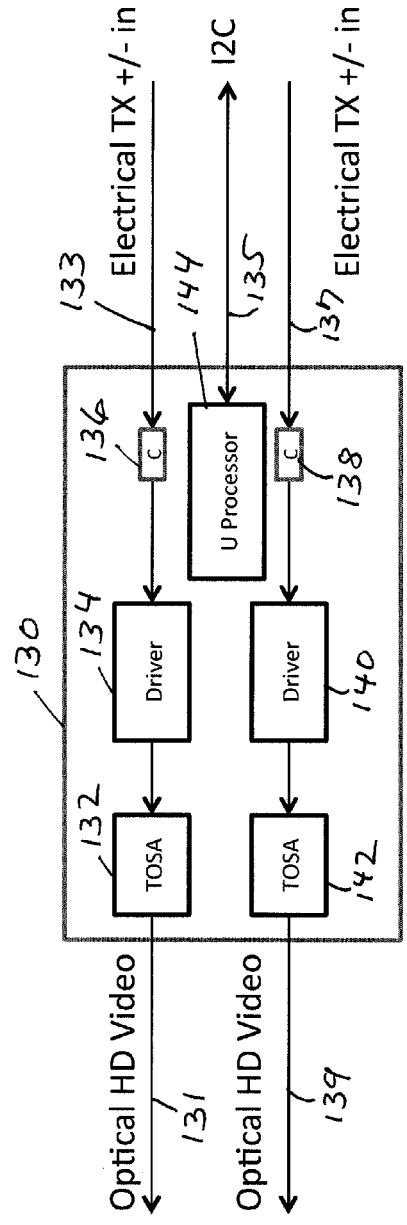
FIG. 12b is a block diagram of a dual optical transmitter video module configured in accordance with the present invention.

FIG. 12b is a block diagram 130 of a miniature pluggable dual optical video transmitter configured in accordance with the present invention. The block diagram 130 illustrates an optical HD video output 131 connected to a TOSA 132, which is a video pathological capable VCSEL optical laser assembly. The TOSA 132 is driven by a video pathological capable VCSEL or laser driver 134. An AC coupling capacitor pair 136 having a capacitance of 4.7 microfarads or greater is connected to the driver 134 and receives electrical inputted video signal from a copper connector 133.

In accordance with the present invention, the reduced size of the module 10 is achieved while still incorporating capacitor pairs inside the housing having a capacitance value of at least 4.7 microfarads.

Similarly, a second optical HD video output 139 is connected to a TOSA 142, which is a video pathological capable VCSEL optical laser assembly. The TOSA 142 is driven by a video pathological capable VCSEL or laser driver 140. An AC coupling capacitor pair 138 having a capacitance of 4.7 microfarads or greater is connected to the driver 140 and receives electrical inputted video signal from a copper connector 137. The dual transmitter transceiver block diagram 130 includes a microprocessor 144 which is connected to an I²C digital diagnostic interface 135.

Figure 12C:
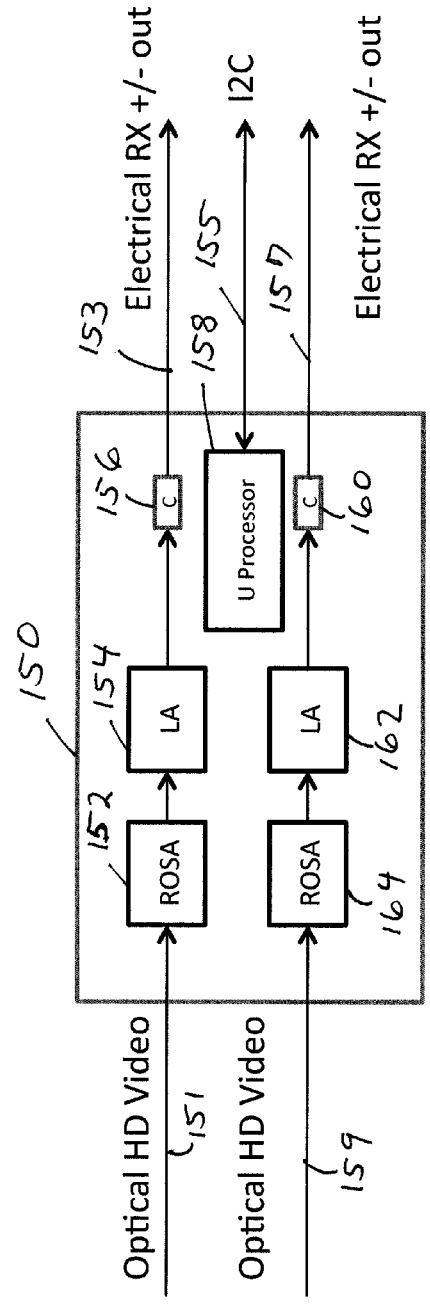
FIG. 12c is a block diagram of a dual optical receiver video module configured in accordance with the present invention.

FIG. 12c is a block diagram 150 of a miniature pluggable dual optical video receiver configured in accordance with the present invention. The block diagram 150 illustrates an optical HD video input 151 connected to a ROSA 152, which is a video pathological capable optical detector and TIA assembly. The ROSA 152 is connected to a LA 154, which is a video pathological capable limiting amplifier. The LA 154 is connected to an AC coupling capacitor pair 156 having a capacitance of 4.7 microfarads or greater, which then outputs video to a copper connector 153.

Similarly, a second ROSA 164 is connected to an optical HD video input 159. The ROSA 164 transmits to a LA 162, which is a video pathological capable limiting amplifier. The LA 162 is connected to an AC coupling capacitor pair 160 having a capacitance of 4.7 microfarads or greater, which then outputs video to a copper connector 157. The dual receiver block diagram 150 includes a microprocessor 158 which is connected to an I²C digital diagnostic interface 155.

Figure 13A:
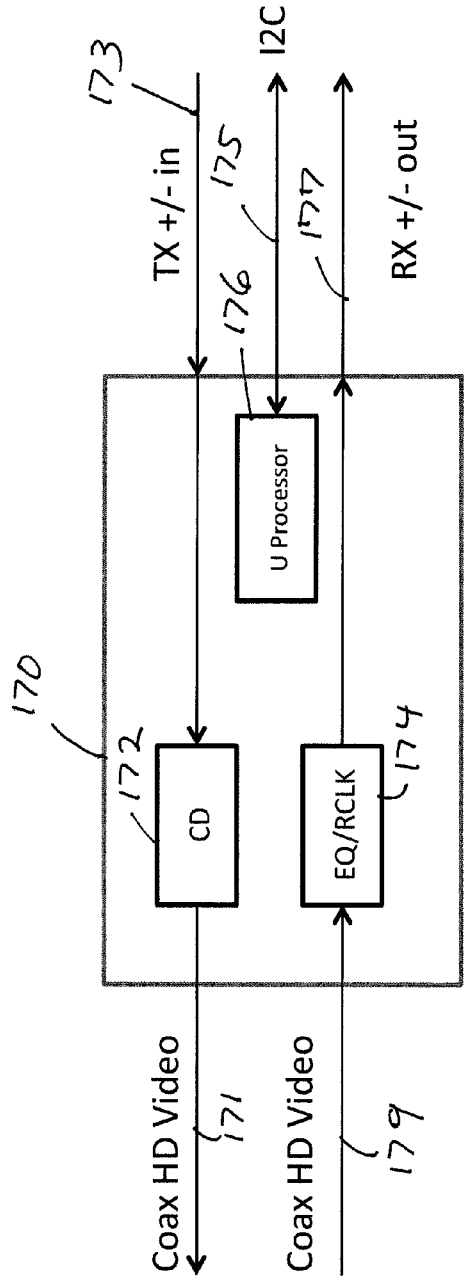
FIG. 13a is a block diagram of a copper wire transceiver video module configured in accordance with the present invention.

FIG. 13a is a block diagram 170 of a copper to copper transceiver module. A cable driver (CD) 172 is connected to a coax HD video output 171 that provides a single ended 75-ohm terminated signal. The CD 172 also is connected to an input (TX+/−in) 173 that is a 100-ohm differential electrical that interfaces to a host PCB connector for an optical transceiver module of the present invention.

The coax HD video input 179 is a single ended 75 ohm terminated video signal connected to a cable equalizer (EQ) having an optional reclocker (RCLK) 174, which is connected to an output (RX+/−) 177 that is a 100 ohm differential electrical connector that would interface to a host PCB connector for an optical transceiver module of the present invention. A microprocessor 176 is connected to an I²C digital diagnostic interface 175.

The EQ 174 receives the coax HD video input 179 which amplifies the signals to be transmitted down the maximum specified length of a 75 ohm coaxial cable. The EQ 174 corrects and amplifies signals to generate RX+/−100 ohm differential signals. The RCLK 174 retimes received signals after the equalization process.

Figure 13B:
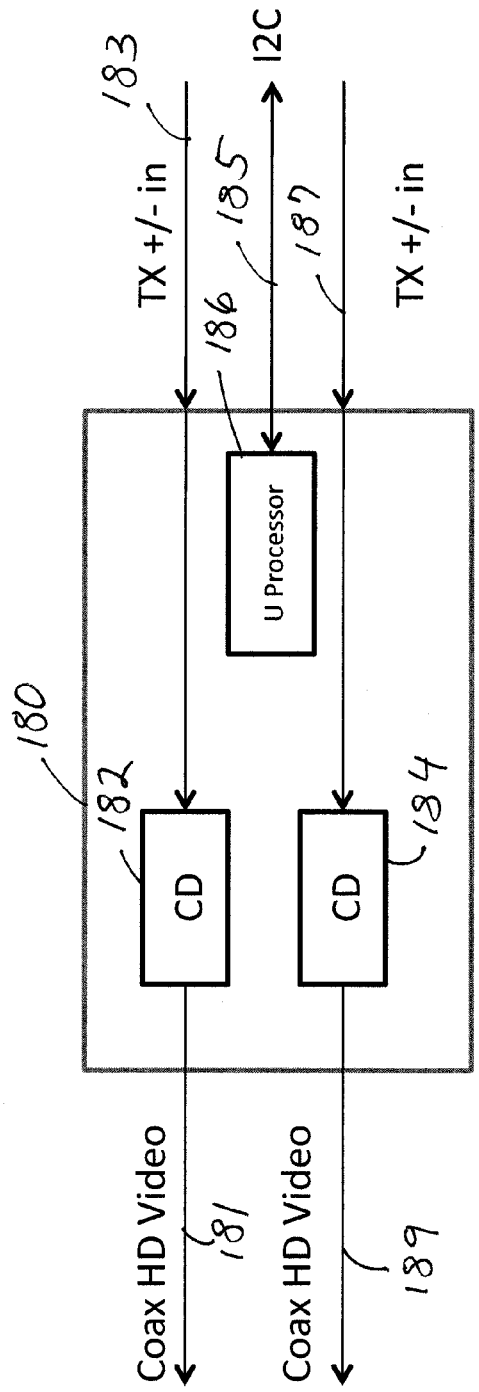
FIG. 13b is a block diagram of a dual copper wire transmitter video module configured in accordance with the present invention.

FIG. 13b is a block diagram 180 of a dual transmitter copper to copper pluggable video module. Two CDs 182,184 are connected to 75 ohm coax HD video outputs 181,189 and 100 ohm TX inputs 183,187, respectively. A microprocessor 186 is connected to an I²C digital diagnostic interface 185.

FIG. 13c is a block diagram 190 of a dual receiver copper to copper pluggable video module. Two EQs 192,194 are connected to 75 ohm coax HD video inputs 191,199 and 100 ohm TX outputs 193,197, respectively. A microprocessor 196 is connected to an I²C digital diagnostic interface 195.

FIG. 14a is a perspective view of a miniature video transceiver module 200 configured in accordance with a further embodiment of the present invention. The perspective view of FIG. 14a shows the front 216, top 212, and side 220 of the module 200. The module 200 includes a back 218 and a side 222 opposite side 220. The module 200 have a length L between the front 216 and the back 218. The module has a width W between the sides 220 and 222.

Similar to the miniature pluggable video module 10, the miniature pluggable video module 200 includes guide channels or channels 224,226 in the top 212. The channels 224, 226 include dips 213,215, respectively, in the rear for receiving the compression tabs 44,46 of the horizontally mounted cage 40, or compression tabs 67,68 of the vertically mounted cage 60.

In accordance with a further aspect of the present invention, the front 216 of the module 200 include both an electrical connector and an optical connector. The electrical or copper wire connector 250 at the front 216 of the module 200 can be one of many electronic connectors, such as a simplex ST, but the illustrated example in FIG. 14a is a mini BNC connector. The front 216 of the module 200 also includes an optical connector or receptacle 252. Similar to the electrical connector 250, the optical connector 252 can be one of many optical connectors, but the example illustrated in FIG. 14a is a receptacle for an LC connector.

A threaded aperture 211 for a mounting screw is located in the top 212 of the module 200. The top 212 is preferably constructed of a single element, such as molded plastic or metal. The outer housing of the module 200 is preferably electrically conductive to discharge static charge during insertion into a mounting cage, which can be achieved by constructing the housing out of metal or coating a plastic housing with conductive material. The width W of the module 200 between the sides 220 and 222 is preferably less than 0.75 inches. FIG. 14b is a perspective view showing the front 216, side 220, and bottom 214 of the module 200.

FIG. 15a is a bottom view of the module 200. In addition to the electrical connector 250, a plurality of pin connectors 232 is illustrated at the back 218 of the module 200. A bottom mounting screw 217 is located in the bottom 214 of the module 200 for securing a bottom panel 219 to the bottom 214 of the module 200. The plurality of pin connectors 232 having pins 233 is located at the back 218 and bottom 214 of the module 200 is clearly shown in FIG. 15a. The pins 233 extend parallel to the bottom panel 219 of the module 200, enabling the module 200 to be pluggably connected to a multiple pin receptacle, for example, located on a printed circuit board within a mounting cage for receiving pluggable modules.

FIG. 15b is a front view of the module 200 showing a direct front view of the electrical wire BNC connector 250 and the optical LC receptacle 252. The LC receptacle 252 contains an optical port 251. The optical port 251 preferably uses single mode (SM) vertical-cavity surface-emitting lasers (VCSELs) if it is an optical output to reduce power consumption. Of course, BNC connector can be either an input or and output. Additionally, the electrical connector 250 and the optical connector 252 can be a combination of dual outputs, dual inputs, or a combination of an input and an output.

FIG. 15c is a plan view of the module 200 showing the top 212. The channels 224,226 in the top 212 of the module 200 having the dips 213,215, respectively, are clearly illustrated.

The screw aperture 211 is shown. Moreover, the width W between the sides 222 and 220 is clearly shown, and the length L between the front 216 and the back 218 of the miniature pluggable video module 200 are clearly illustrated. The width W is preferably less than 0.75 inches, and the length L is preferably less than one inch.

While specific embodiments have been shown and described to point out fundamental and novel features of the invention as applied to the preferred embodiments, it will be understood that various omissions and substitutions and changes of the form and details of the apparatus illustrated and in the operation may be done by those skilled in the art, without departing from the spirit of the invention.

The invention claimed is:

1. A miniature pluggable video module, comprising:
   a housing having a top, a bottom, a front, a back, and first and second sides, said housing having a length between the front and back, and a width between the first and second sides;
   said housing having a length less than one inch, and a width less than three quarters of an inch;
   first and second connectors attached to the front of the housing;
   a plurality of pin connectors attached to the back of the housing;
   circuitry located within the housing for handling pathological conditions associated with digital video signals;
   first and second capacitor pairs having capacitance values of at least 4.0 microfarads;
   said first capacitor pair connected to at least two pins of the plurality of pin connectors; and
   said second capacitor pair connected to at least two pins of the plurality of pin connectors.

2. The miniature pluggable video module of claim 1, wherein the circuitry for handling pathological conditions is internally AC coupled.

3. The miniature pluggable video module of claim 1, wherein the circuitry for handling pathological conditions includes pathological conditions generated by checkfield test signals associated with digital video signals.

4. The miniature pluggable video module of claim 1, further comprising:
   a controller located within the housing and connected to an I²C digital diagnostic interface.

5. The miniature pluggable video module of claim 4, wherein the controller is a microprocessor.

6. The miniatures pluggable video module of claim 4, wherein the I²C digital diagnostic interface is electrically connected to at least one pin of the plurality of pin connectors.

7. The miniature pluggable video module of claim 1, further comprising:
   a horizontal mounting cage for receiving the pluggable video module,
   a horizontal mounting pin receptacle for receiving the plurality of pin connectors on the module;
   said module including at least one channel in the top; and
   said horizontal mounting cage including compression tabs sized to fit into the at least one channel during insertion of the module into the horizontal mounting cage to latch the module within the horizontal mounting cage.

8. The miniature pluggable video module of claim 1, further comprising:
   a vertical mounting cage for receiving the pluggable video module,
   a vertical mounting pin receptacle for receiving the plurality of pin connectors on the module;
   said module including at least one channel in the top; and
   said vertical mounting cage including compression tabs sized to fit into the at least one channel during insertion of the module into the vertical mounting cage to latch the module within the vertical mounting cage.

9. The miniature pluggable video module of claim 6, further comprising:
   a removal key having at least one finger sized to slide into the at least one channel and under the compression tabs so as to unlatch the module from the horizontal mounting cage.

10. The miniature pluggable video module of claim 8, further comprising:
    a removal key having at least one finger sized to slide into the at least one channel and under the compression tabs so as to unlatch the module from the horizontal mounting cage.

11. The miniature pluggable video module of claim 1, further comprising:
    a transmitter optical subassembly (TOSA) compatible with video pathological conditions and connector to the first connector;
    a receiver optical subassembly (ROSA) compatible with video pathological conditions and connected to the second connector; said ROSA including a transimpedance amplifier (TIA);
    a limiting amplifier connected to the ROSA and compatible with video pathological conditions; and
    a laser driver compatible with video pathological conditions and connected to the TOSA.

12. The miniature pluggable video module of claim 1, wherein the digital video signals conform to Society of Motion Picture and Television Engineers (SMPTE) format standards.

13. The miniature pluggable video module of claim 1, further comprising:
    a TOSA including a video pathological capable VCSEL optical laser assembly.

14. The miniature pluggable video module of claim 13, further comprising:
    a video pathological capable laser driver coupled to the TOSA.

15. The miniature pluggable video module of claim 13, further comprising:
    a video pathological capable VCSEL driver coupled to the TOSA.

16. The miniature pluggable video module of claim 1, further comprising:
    a ROSA including a video pathological capable optical detector and TIA assembly.

17. The miniature pluggable video module of claim 16, further comprising:
    a video pathological capable limiting amplifier (LA) coupled to the ROSA.

18. The miniature pluggable video module of claim 1, wherein the circuitry located within the housing handles pathological condition checkfields generated by test signals associated with Society of Motion Picture and Television Engineers (SMPTE) digital video signals.

19. The miniature pluggable video module of claim 1, wherein the top of the module includes at least one channel.

20. The miniature pluggable video module of claim 1, wherein the first and second connectors are optical connectors.

* * * * *